(12) United States Patent
Aso

(10) Patent No.: US 7,979,581 B2
(45) Date of Patent: Jul. 12, 2011

(54) APPARATUS AND METHOD FOR PROPER NAME RESOLUTION

(75) Inventor: Takahiro Aso, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1002 days.

(21) Appl. No.: 10/939,455

(22) Filed: Sep. 14, 2004

(65) Prior Publication Data

US 2005/0086377 A1   Apr. 21, 2005

(30) Foreign Application Priority Data

Sep. 16, 2003   (JP) .................................. 2003-323540

(51) Int. Cl.
*G06F 15/16*   (2006.01)

(52) U.S. Cl. ....................................................... 709/245

(58) Field of Classification Search .................. 709/245
See application file for complete search history.

(56) References Cited

U.S. PATENT DOCUMENTS

| | | | | |
|---|---|---|---|---|
| 5,327,534 A | * | 7/1994 | Hutchison et al. | 709/226 |
| 5,724,510 A | * | 3/1998 | Arndt et al. | 709/220 |
| 6,493,340 B1 | * | 12/2002 | Kawanaka | 370/392 |
| 6,925,079 B2 | * | 8/2005 | Matsukawa | 370/389 |
| 7,075,897 B2 | * | 7/2006 | Uematsu | 370/255 |
| 7,200,649 B1 | * | 4/2007 | Batke et al. | 709/222 |
| 7,574,508 B1 | * | 8/2009 | Kommula | 709/226 |
| 2001/0027469 A1 | * | 10/2001 | Torikai | 709/202 |
| 2002/0013848 A1 | * | 1/2002 | Rene Salle | 709/226 |
| 2002/0161745 A1 | * | 10/2002 | Call | 707/1 |
| 2003/0046428 A1 | | 3/2003 | Elg et al. | |
| 2003/0126241 A1 | | 7/2003 | Nagura et al. | |
| 2003/0195985 A1 | * | 10/2003 | Yokota | 709/245 |
| 2004/0083306 A1 | * | 4/2004 | Gloe | 709/245 |
| 2004/0148398 A1 | * | 7/2004 | Park | 709/227 |
| 2004/0263898 A1 | * | 12/2004 | Ferlitsch | 358/1.15 |

FOREIGN PATENT DOCUMENTS

| | | |
|---|---|---|
| EP | 0 756 405 A2 | 1/1997 |
| EP | 1 128 635 A2 | 8/2001 |
| EP | 1 253 766 A2 | 10/2002 |
| EP | 1 345 355 A2 | 9/2003 |
| JP | 2000-101589 | 4/2000 |
| JP | 2003-87287 | 3/2003 |

OTHER PUBLICATIONS

S. Daniel Park, et al., "IPv6 Extensions for DNS Plug and Play", IETF, Internet Draft, draft-park-ipv6-extensions-dns-pnp-oo.txt, XP-015004780, Apr. 30, 2003, pp. 1-30.

M. Stapp, "Resolution of DNS Name Conflicts Among DHCP Clients", IETF, Internet Draft, draft-ietf-dhc-ddns-resolution-05.txt, XP-015001649, Nov. 1, 2002, pp. 1-11.

(Continued)

*Primary Examiner* — Yemane Mesfin
*Assistant Examiner* — Thomas Richardson
(74) *Attorney, Agent, or Firm* — Oblon, Spivak, McClelland, Maier & Neustadt, L.L.P.

(57) ABSTRACT

An image processing apparatus to be coupled to a DNS server through a network includes a name registration requesting unit configured to transmit a registration request to the DNS server to request registration of a correspondence between a host name and address information of the image processing apparatus, and an alias registration requesting unit configured to transmit a registration request to the DNS server to request registration of a correspondence between a uniquely defined alias and the address information of the image processing apparatus.

14 Claims, 21 Drawing Sheets

OTHER PUBLICATIONS

H. Kitamura, "Domain Name Auto-Registration for Plugged-in IPv6 Nodes", IETF, Internet Draft, draft-kitamura-ipv6-name-auto-reg-02.txt, XP-015003956, Jul. 1, 2002, pp. 1-21.

Jae-Hoon Jeong, et al., "IPv6 Router Advertisement based DNS Autoconfiguration", IETF, Internet Draft, draft-jeong-ipv6-ra-dns-autoconf-00.txt, XP-015003801, Apr. 17, 2003, pp. 1-11.

Jae-Hoon Jeong, et al., "Unique DNS Name Generation", IETF, Internet Draft, draft-jeong-name-generation-01.txt, XP-015003803, Feb. 28, 2003, pp. 1-6.

Jaehoon Jeong, et al., "Name Service in IPv6 Mobile Ad-hoc Network connected to the Internet", The 14th IEEE 2003 International Symposium on Personal, Indoor and Mobile Radio Communication Proceedings, vol. 2, XP-010679283, Sep. 7, 2003, pp. 1351-1355.

P. Mockapetris, "Domain Names-Concepts and Facilities", Network Working Group, RFC: 1034, XP-015005973, Nov. 1987, pp. 1-55.

M. Stapp, ", The DHCP Client FQDN Option", IETF, Internet Draft, draft-ietf-dhc-fqdn-option-05.txt, XP-015001675, Nov. 1, 2005, pp. 1-15.

M. Stapp, "The DHCP Client FQDN Option", IETF, Internet Draft, draft-ietf-dhc-fqdn-option-05.txt, XP-015001675A, Nov. 1, 2002, pp. 1-15.

\* cited by examiner

690
DNS
Flag = 01: Query

ZONE=RNP123456.abc.co.jp  — 691
Type = 1   Class = 1

710
DNS
Flag = 85: Responce

ZONE
Name = abc.co.jp
Type = 1   Class = 1

Answer
Name =RNP123456.abc.co.jp
Type = 1   Class = 1
TTL = 1466
Length = 4
Address = 192.168.1.2  — 711

APPARATUS AND METHOD FOR PROPER NAME RESOLUTION

BACKGROUND OF THE INVENTION

1. Field of the Invention

The present invention generally relates to image-processing apparatuses, image-processing systems, name registration methods, name registration programs, and record media, and particularly relates to an image-processing apparatus connected with a DNS server through a network, an image-processing system comprised of such image-processing apparatus, a name registration method for use in such image-processing apparatus, a name registration program corresponding to such a method, and a record medium having such program recorded therein.

2. Description of the Related Art

In the TCP/IP network environment, computers, network apparatuses, etc. connected to networks are uniquely identified by their IP addresses. Since IP addresses are nothing but a series of numerals, they are difficult for users to remember. In consideration of this, a system called DNS (Domain Name System) is employed, by which computers or the like are accessed by use of host names, which are character strings that are easier for users to handle.

In the DNS, DNS servers manage and control correspondences between host names and associated IP addresses. A DNS server resolves a host name in response to an inquiry from a client, and notifies the client of a corresponding IP address. As long as correspondences between the IP addresses assigned to computers or the like and the respective host names are correctly managed, proper name resolution by DNS servers is guaranteed.

IP addresses are generally assigned by a network administrator or the like. In each apparatus, a setup process must be performed to set an assigned IP address.

In order to reduce the user load for such work, to avoid a human error creating duplicate settings of the same IP address, and to facilitate effective use of IP addresses, DHCP servers are now used for the purpose of dynamically assigning IP addresses. DHCP servers can automatically assign IP addresses to individual apparatuses. Further, IP addresses assigned by the DHCP servers can be automatically set in apparatuses serving as clients associated with DHCP servers. This makes it possible to reduce the work load of network administrators and end users.

When a DHCP server is used in the DNS environment, however, a trouble may arise. As previously described, a DNS server manages correspondences between host names and associated IP addresses, and resolves names based on the correspondences. For such a DNS server, therefore, it is preferable to have static IP addresses, and the presence of a DHCP server that changes IP addresses dynamically contributes to the lowering of the reliability of the DNS server in terms of name resolution.

Against this background, the DDNS (Dynamic Domain Name System) has been developed as a technology for implementing the DNS also in the environment where IP addresses change dynamically. In the DDNS, each apparatus reports an IP address assigned by the DHCP server to the DNS server together with a hose name. With this provision, the DNS server keeps the latest correspondences all the time, thereby providing dynamic name resolution.

Moreover, Japanese Patent Application Publication No. 2000-101589 discloses a system that achieves a DDNS environment. This system provides for a DHCP server to report an IP address assigned to an apparatus to a DNS server, thereby keeping correspondences managed by the DNS server in the most recent status.

However, host names are also determined by humans in the DDNS environment. There is thus a possibility of a host name being mistakenly set to the same name as another apparatus.

FIG. 1 is an illustrative drawing for showing an example in which duplicate hose names are set. A system 500 of FIG. 1 includes a printer 510, a DHCP server 520, a client PC 530, a client PC 540, and a DNS server 550. The client PCs 530 and 540 are terminals such as PCs (personal computers) or the like for direct use by users. The client PC 530 has the IP address "192.168.1.4" and the host name "client.abc.co.jp", and the client PC 540 has the IP address "192.168.1.3" and the host name "hostname.abc.co.jp". Correspondences between the IP addresses and the host names are managed in the DNS server 550.

With respect to the printer 510, for example, the same host name ("hostname.abc.co.jp") as the client PC 540 is set by mistake (S1). The printer 510 requests the DNS server 550 to register the correspondence between the newly set host name and the associated IP address (S2). In response, the DNS server 550 registers the correspondence between the host name "hostname.abc.co.jp" and the IP address "192.168.1.2" as a new entry.

Learning that the host name of the printer 510 is set to "hostname.abc.co.jp", a user makes a setting such that the client PC 530 identifies the printer 510 as "hostname.abc.co.jp". When the user gives a print instruction to print document data to the printer 510, the client PC 530 requests the DNS server 550 to resolve the name "hostname.abc.co.jp" (S3).

The DNS server 550 attempts to resolve the name "hostname.abc.co.jp". Since there are two registered records indicative of the host name "hostname.abc.co.jp", the DNS server 550 may mistakenly return the IP address of the client PC 540 to the client PC 530 (S4).

In this case, the client PC 530 issues a print request to the client PC 540 rather than to the printer 510 as originally intended, resulting in a failure to perform the printing of document data.

The same argument applies not only when there are duplicate host names but also when the host name of the printer 510 is changed without the knowledge of other users. In such a case, the client PC 530 tries to access the printer 510 by use of the host name before the change. Since the DNS server 550 manages correspondences based on the latest host names at all times, name resolution may not be performed correctly.

Accordingly, there is a need for an image-processing apparatus, an image-processing system, a name registration method, a name registration program, and a record medium which provide a DNS server to perform proper name resolution even when a host name is changed or provided as a duplicate of the host name of another apparatus in the DDNS environment.

SUMMARY OF THE INVENTION

It is a general object of the present invention to provide an image-processing apparatus, an image-processing system, a name registration method, a name registration program, and a record medium that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by an image-processing apparatus, an image-processing system, a name registration method, a name registration program, and a record medium particularly pointed out in the specification in such full, clear, concise, and exact terms as to enable a person having ordinary skill in the art to practice the invention.

To achieve these and other advantages in accordance with the purpose of the invention, the invention provides an image processing apparatus to be coupled to a DNS server through a network, the image processing apparatus including a name registration requesting unit configured to transmit a registration request to the DNS server to request registration of a correspondence between a host name and address information of the image processing apparatus, and an alias registration requesting unit configured to transmit a registration request to the DNS server to request registration of a correspondence between a uniquely defined alias and the address information of the image processing apparatus.

With the image processing apparatus as described above, an alias uniquely defined for the image processing apparatus is registered in the DNS server in addition to the host name that is at risk of being changed. The DNS server thus successfully responds to a request for name resolution based on the alias even if the host name of the image processing apparatus is duplicated or changed.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 1:
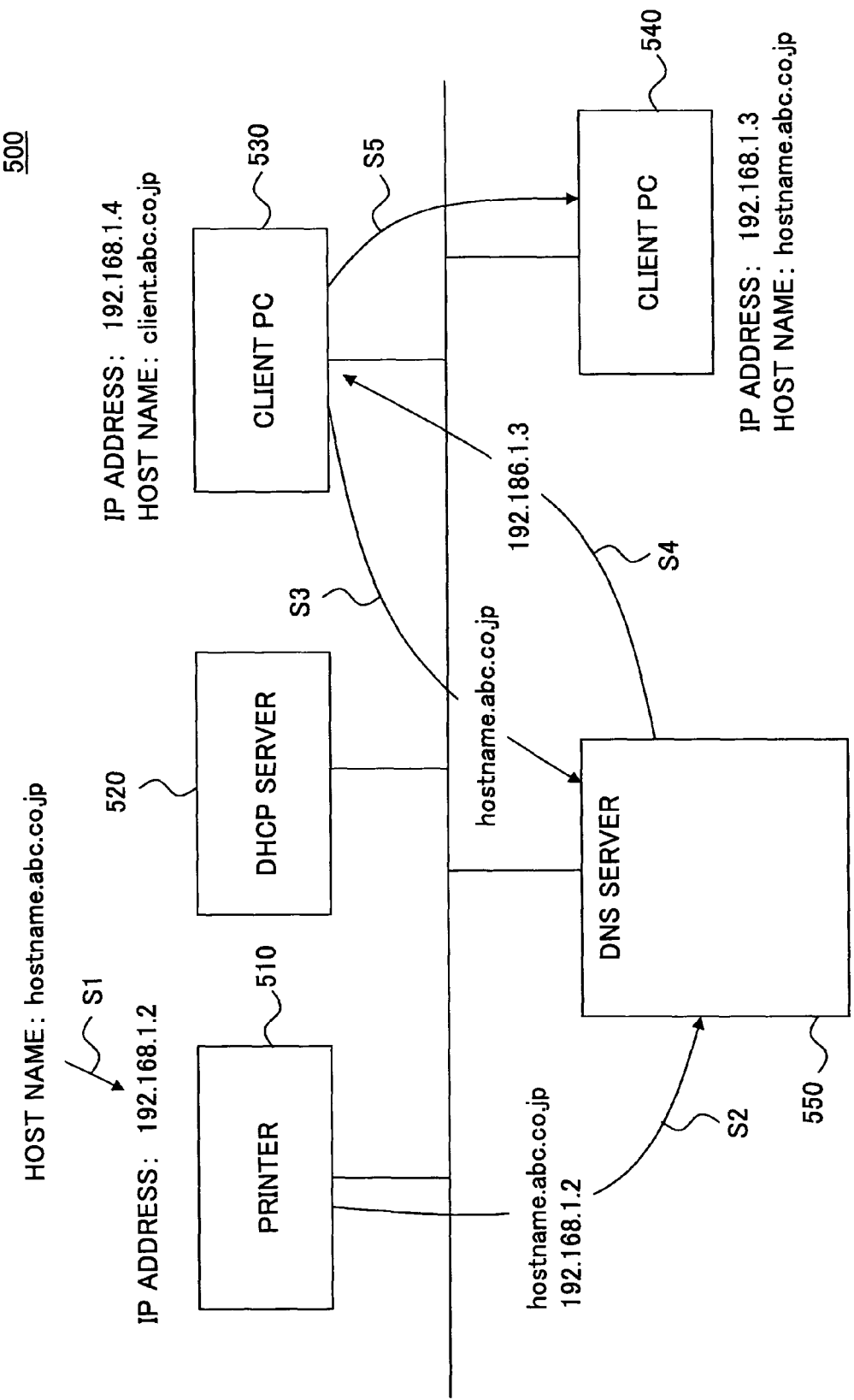
FIG. 1 is an illustrative drawing for showing an example in which duplicate hose names are set.
Figure 2:
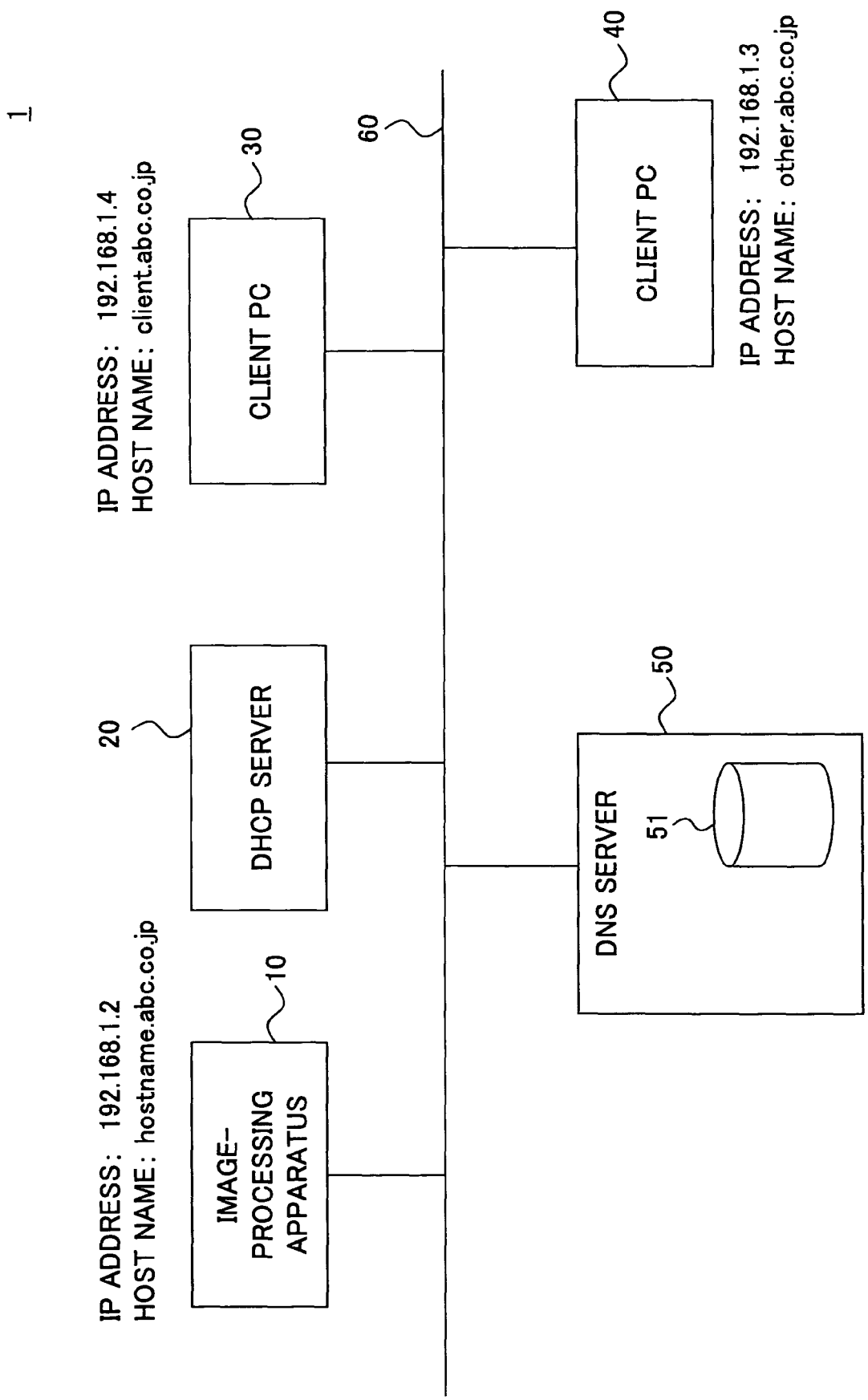
FIG. 2 is a block diagram of an example of an image-processing system according to an embodiment of the invention.

FIG. 2 is a block diagram of an example of an image-processing system according to an embodiment of the invention. In FIG. 2, an image-processing system 1 includes an image-processing apparatus 10, a DHCP server 20, a client PC 30, a client PC 40, and a DNS server 50, which are connected through a network 60 such as a LAN or the Internet.

Image-processing apparatus 10 is a printer which prints image data or the like in response to a request from the client PC 30 or the like. The image-processing apparatus 10 is identified on the network 60 by the IP address "192.168.1.2" and the host name "hostname.abc.co.jp". The DHCP (Dynamic Host Configuration Protocol) server 20 is a so-called DHCP server, which dynamically assigns IP addresses to individual apparatuses on the network 60 such as the image-processing apparatus 10, the client PCs 30 and 40, etc.

The client PCs 30 and 40 are terminals such as PCs (personal computers) for use by users. The client PC 30 is identified by the IP address "192.168.1.4" and the host name "client.abc.co.jp". The client PC 40 is identified by the IP address "192.168.1.3" and the host name "other.abc.co.jp".

The DNS server 50 is a so-called DNS server, and responds to a request for name resolution from the client PC 30 by returning an IP address corresponding to a host name. The DNS server 50 includes a DNS database table 51, and resolve names based on the DNS database table 51.

Figure 3:
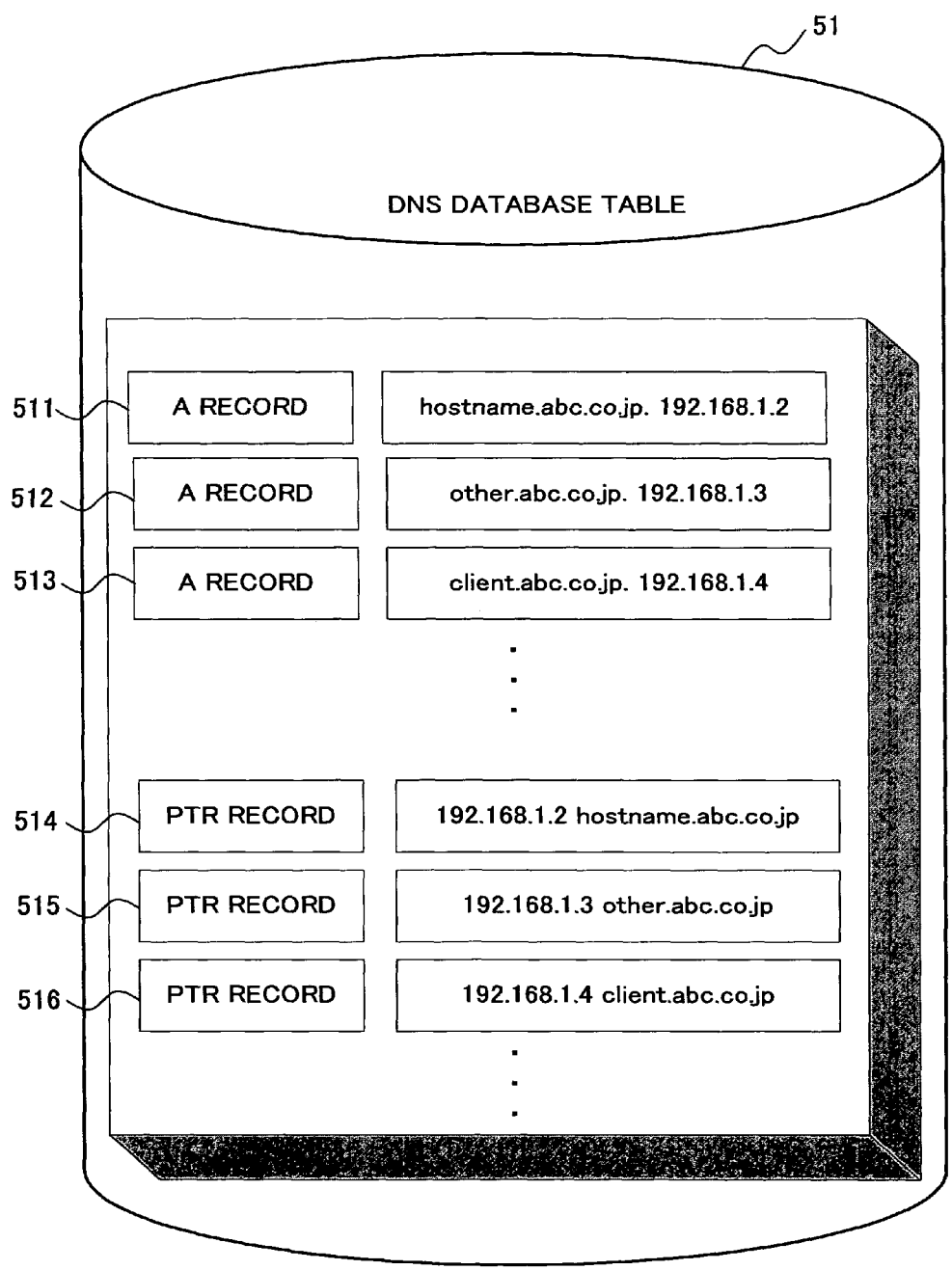
FIG. 3 is an illustrative drawing showing an example of the structure of a DNS database table.

FIG. 3 is an illustrative drawing showing an example of the structure of a DNS database table. As shown in FIG. 3, A records (record 511-record 513) and PTR records (record 514-record 516) are registered with respect to each apparatus in the DNS database table 51. Here, an A record is used for translating a host name into an IP address in a direct direction, and a PTR record is used for translating an IP address into a host name in an inverse direction. For example, the record 511 is the A record of the image-processing apparatus 10, and the record 514 is the PTR record of the image-processing apparatus 10. In this manner, the DNS database table 51 is provided for the purpose of managing correspondences between host names and IP addresses with respect to individual apparatuses.

In addition, the image-processing system 1 is implemented as a DDNS (Dynamic Domain Name System). Namely, IP addresses assigned to individual apparatuses by the DHCP server 20 are automatically reported to the DNS server 50 by these apparatuses. Even when the IP addresses of these apparatuses are dynamically changed, therefore, the DNS server 50 can relate latest IP addresses to respective host names.

In the following, a description will be given of the detail of the image-processing apparatus 10.

Figure 4:
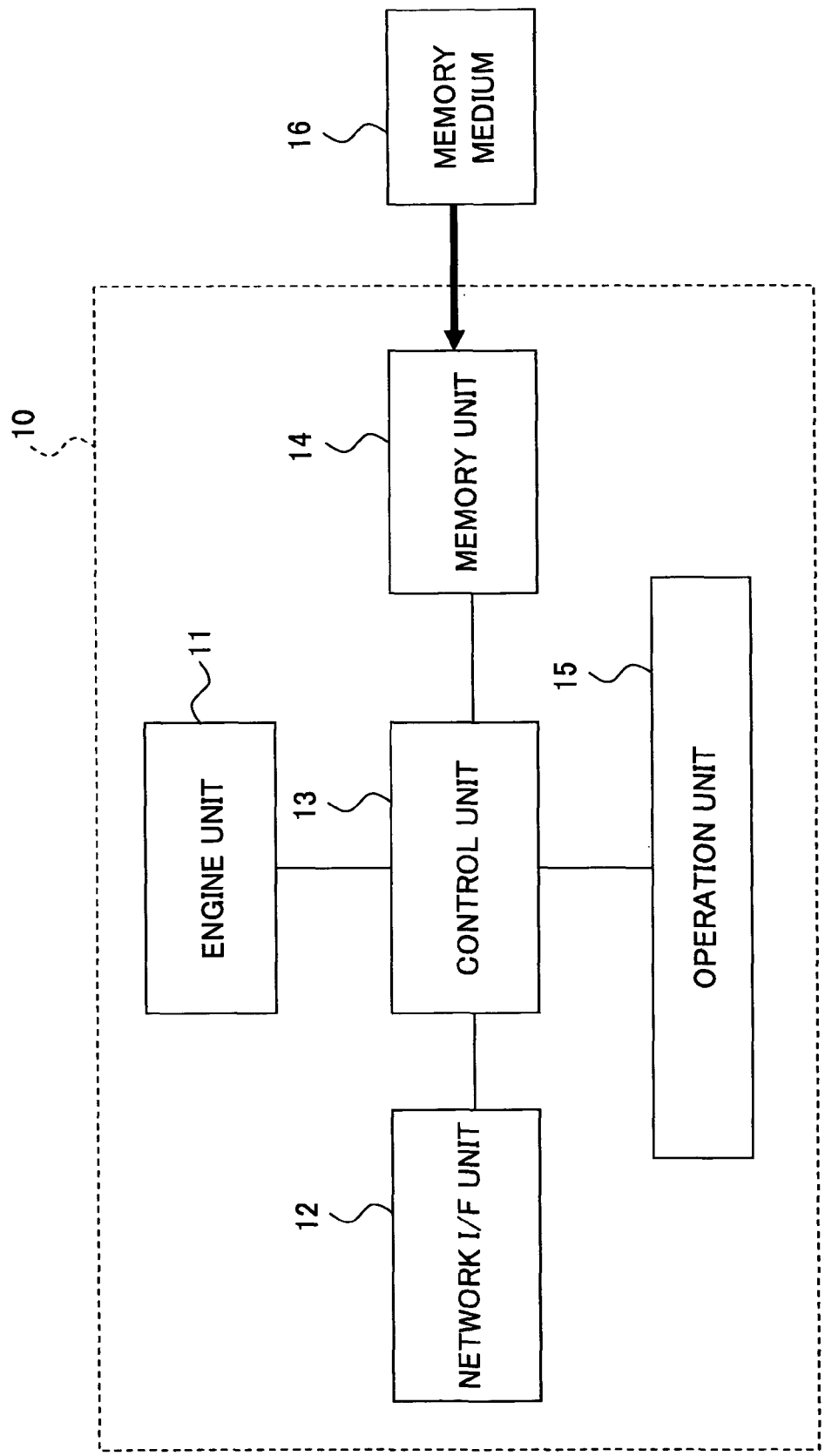
FIG. 4 is a block diagram showing an example of a hardware construction of the image-processing apparatus according to the embodiment of the invention.

FIG. 4 is a block diagram showing an example of a hardware construction of the image-processing apparatus according to the embodiment of the invention. As shown in FIG. 4, the image-processing apparatus 10 includes an engine unit 11, a network I/F unit 12, a control unit 13, a memory unit 14, and an operation unit 15.

A program for implementing the process of the invention on the image-processing apparatus 10 is provided via a recording media 16 such as a CD-ROM, and is installed to the image-processing apparatus 10.

The memory unit 14 stores the installed program, and also stores necessary files, data, etc. The control unit 13 executes the installed program to perform the function of the invention.

The engine unit 11 serves to provide functions specific to image processing. The network I/F unit 12 is used to provide a connection with the network 60 shown in FIG. 2. The operation unit 15 is an interface such as an operation panel by which a user operates the image-processing apparatus 10.

Figure 5:
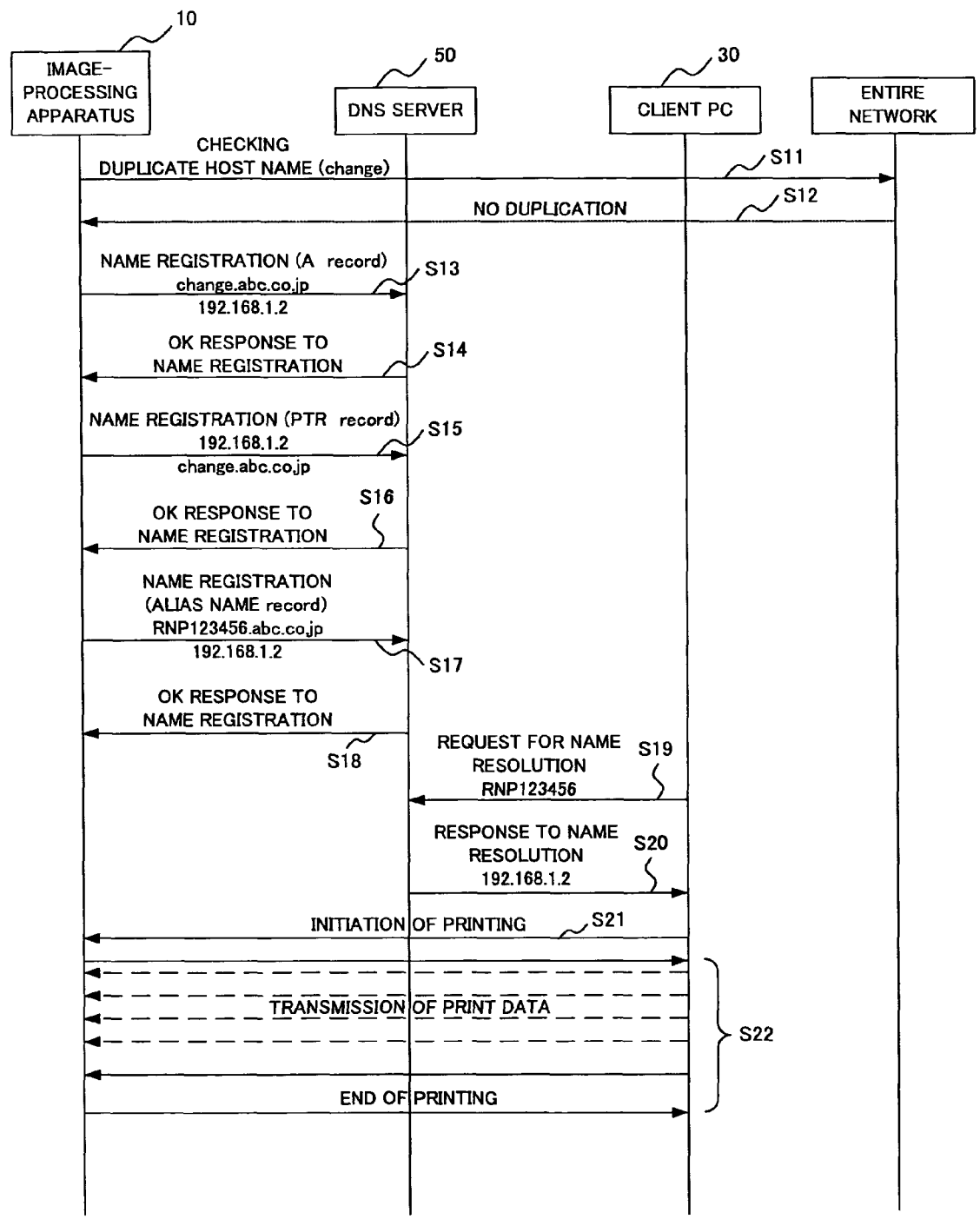
FIG. 5 is a sequence diagram for explaining a procedure that is performed when a host name is changed in the image-processing apparatus.

In the following, a description will be given of the operation of the image-processing system 1 shown in FIG. 2. FIG. 5 is a sequence diagram for explaining a procedure that is performed when a host name is changed in the image-processing apparatus.

At step S11, the image-processing apparatus 10 broadcasts data for checking duplicate host names in response to a change of the host name of the image-processing apparatus 10 to "change.abc.co.jp", for example.

Figure 6:
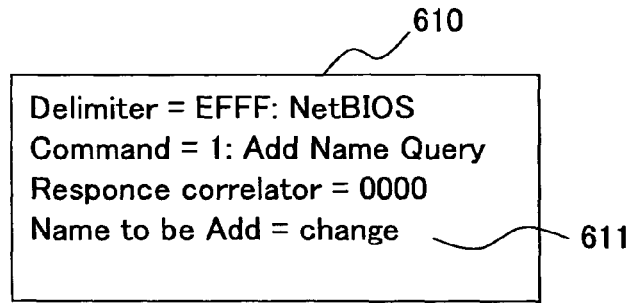
FIG. 6 is an illustrative drawing showing an example of broadcast data for checking duplicate names.

FIG. 6 is an illustrative drawing showing an example of broadcast data for checking duplicate names. A description 611 contained in data 610 shown in FIG. 6 indicates that the name "change" is to be newly added.

When there is no response indicative of duplicate names in response to the duplicate check (S12), the procedure goes to step S13, at which the image-processing apparatus 10 transmits a new host name (change.abc.co.jp) and the IP address (192.168.1.2) of the image-processing apparatus 10 having this new host name to the DNS server 50, requesting to the DNS server 50 that this correspondence be registered as an A record.

Figure 7:
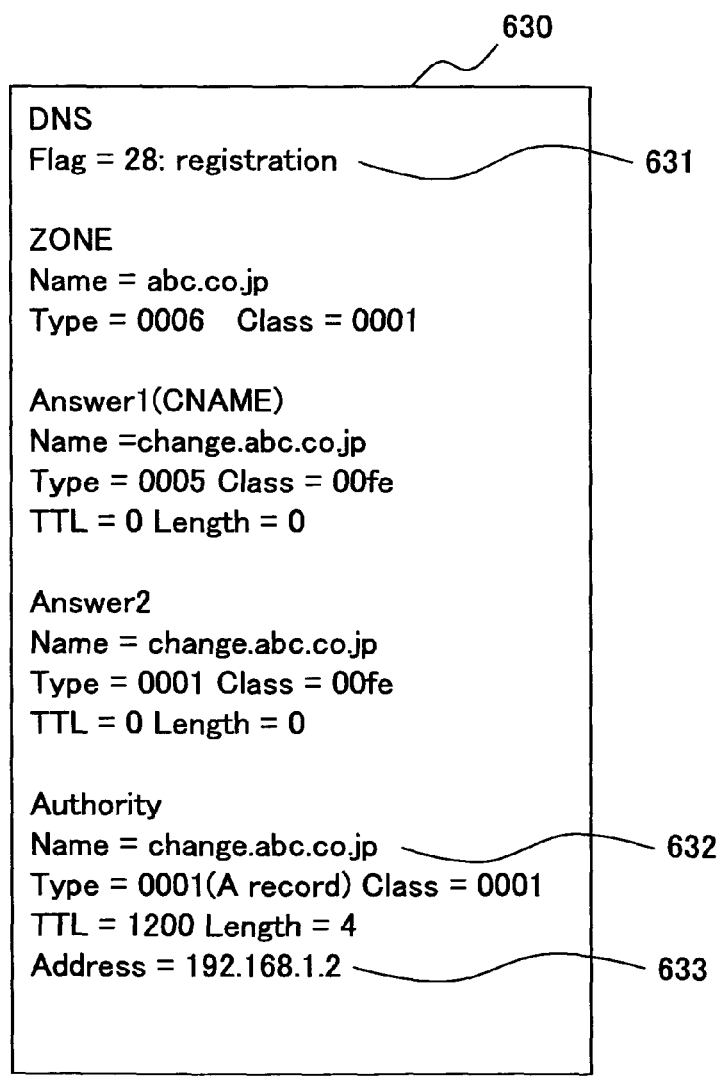
FIG. 7 is an illustrative drawing showing an example of data transmitted for the purpose of requesting the registration of an A record.

FIG. 7 is an illustrative drawing showing an example of data transmitted for the purpose of requesting the registration of an A record. In data 630 of FIG. 7, a description 631 indicates that the data 630 is a request for registration. Further, a description 632 and a description 633 indicate the host name and the IP address to be registered, respectively.

At step S14 following step S13, the DNS server 50 registers the host name and associated IP address received from the image-processing apparatus 10 into the DNS database table 51 as an A record. Furthermore, the DNS server 50 sends a response indicative of the proper completion of registration to the image-processing apparatus 10.

Figure 8:
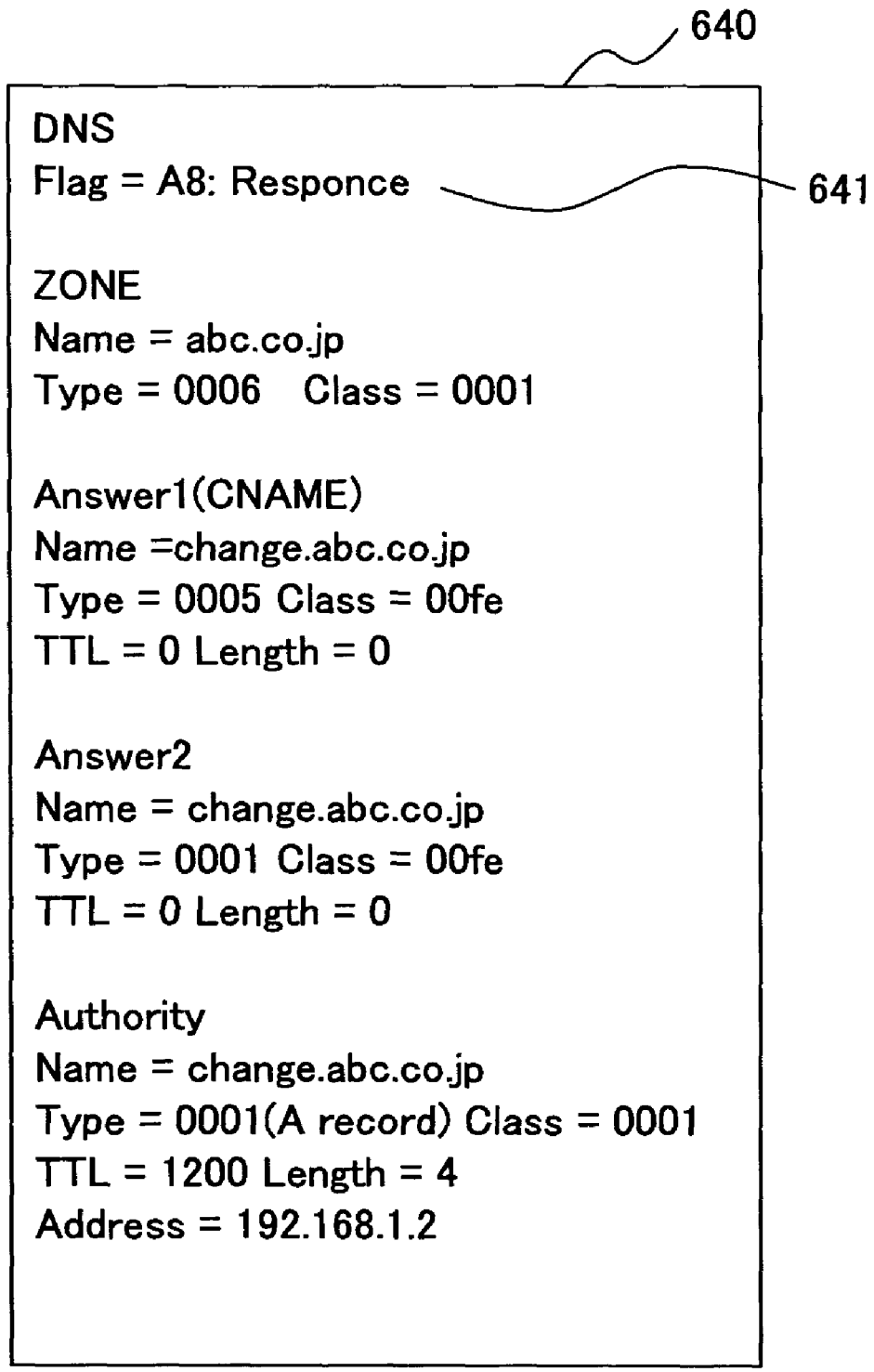
FIG. 8 is an illustrative drawing showing an example of data that is transmitted as a response to a request for registration of an A record.

FIG. 8 is an illustrative drawing showing an example of data that is transmitted as a response to a request for registration of an A record. A description 641 contained in data 640 shown in FIG. 8 indicates that the data 640 is a response.

At step S15 following step S14, the image-processing apparatus 10 transmits the IP address and the new host name associated with the IP address to the DNS server 50, requesting to the DNS server 50 that this correspondence be registered as a PTR record.

Figure 9:
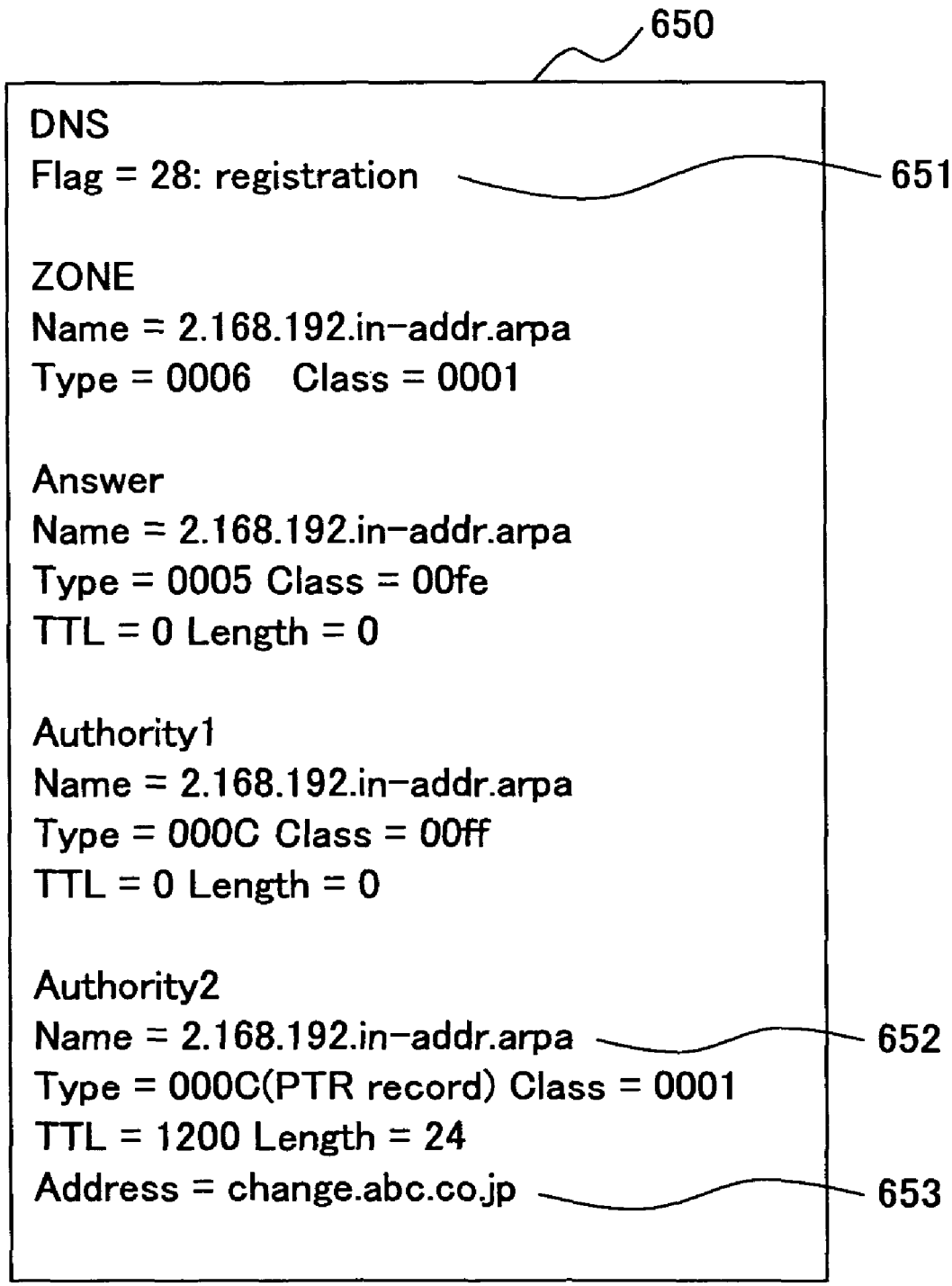
FIG. 9 is an illustrative drawing showing an example of data transmitted for the purpose of requesting the registration of a PTR record.

FIG. 9 is an illustrative drawing showing an example of data transmitted for the purpose of requesting the registration of a PTR record. In data 650 of FIG. 9, a description 651 indicates that the data 650 is a request for registration. Further, a description 652 and a description 653 indicate the IP address and the host name to be registered, respectively.

At step S16 following step S15, the DNS server 50 registers the IP address and the associated host name received from the image-processing apparatus 10 into the DNS database table 51 as a PTR record. Furthermore, the DNS server 50 sends a response indicative of the proper completion of registration to the image-processing apparatus 10.

Figure 10:
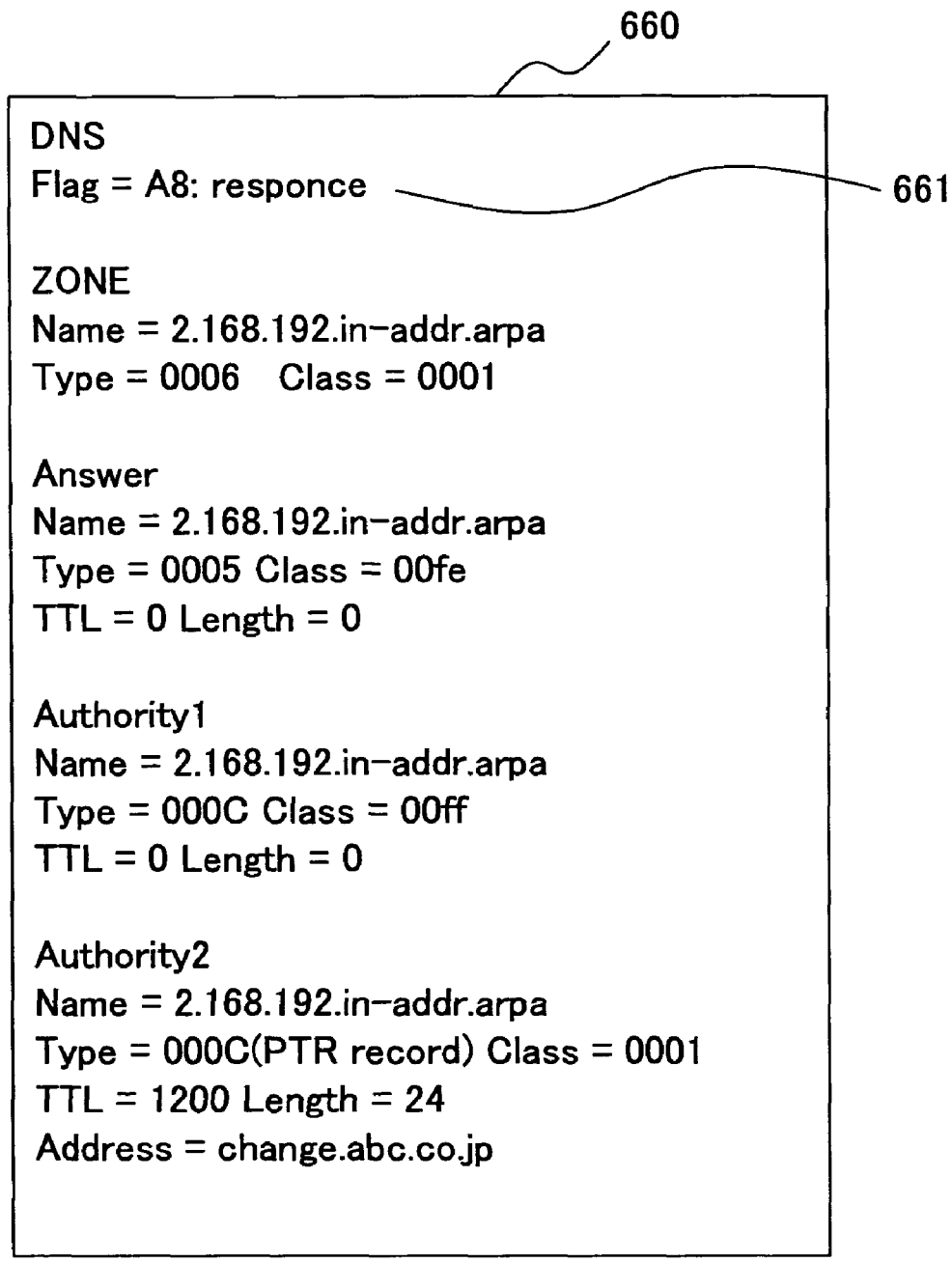
FIG. 10 is an illustrative drawing showing an example of data that is transmitted as a response to a request for registration of a PTR record.

FIG. 10 is an illustrative drawing showing an example of data that is transmitted as a response to a request for registration of a PTR record. A description 661 contained in data 660 shown in FIG. 10 indicates that the data 660 is a response.

At step S17 following step S16, the image-processing apparatus 10 transmits an alias name and the IP address (192.168.1.2) of the image-processing apparatus 10 having this alias name to the DNS server 50, thereby requesting the registration of this correspondence as an alias-name record. The alias name is another name different from the hose name, and has a value that is unique to each apparatus connected to the network 60 and that is not changed dynamically.

An alias name may be arbitrary as long as it is unique to each apparatus connected to the network 60 and is not changed dynamically (i.e., is fixed). For example, the alias name may be an MAC (Media Access Control) address, or may be a serial number. Alternatively, an MAC address or a serial number may be converted through predetermined conversion process into a value that is easy for humans to remember. This will allow easier manipulation.

The value of the MAC address of the image-processing apparatus 10 may be "00:00:74:12:34:56", for example. The 3 upper-grade bytes of the MAC address is a portion assigned to each manufacturer (Vender MAC address portion), so that these 3 upper-grade bytes "00:00:74" may be changed to the manufacturer's name or an abridged version of that name.

This method is employed in the present embodiment, and the image-processing apparatus 10 replace the 3 upper-grade bytes of the MAC address "00:00:74:12:34:56" with the character string "RNP", thereby generating the alias name "RNP123456".

The alias-name record is defined as a record for translating an alias name into an IP address in a direct direction as in the case of the A record.

Figure 11:
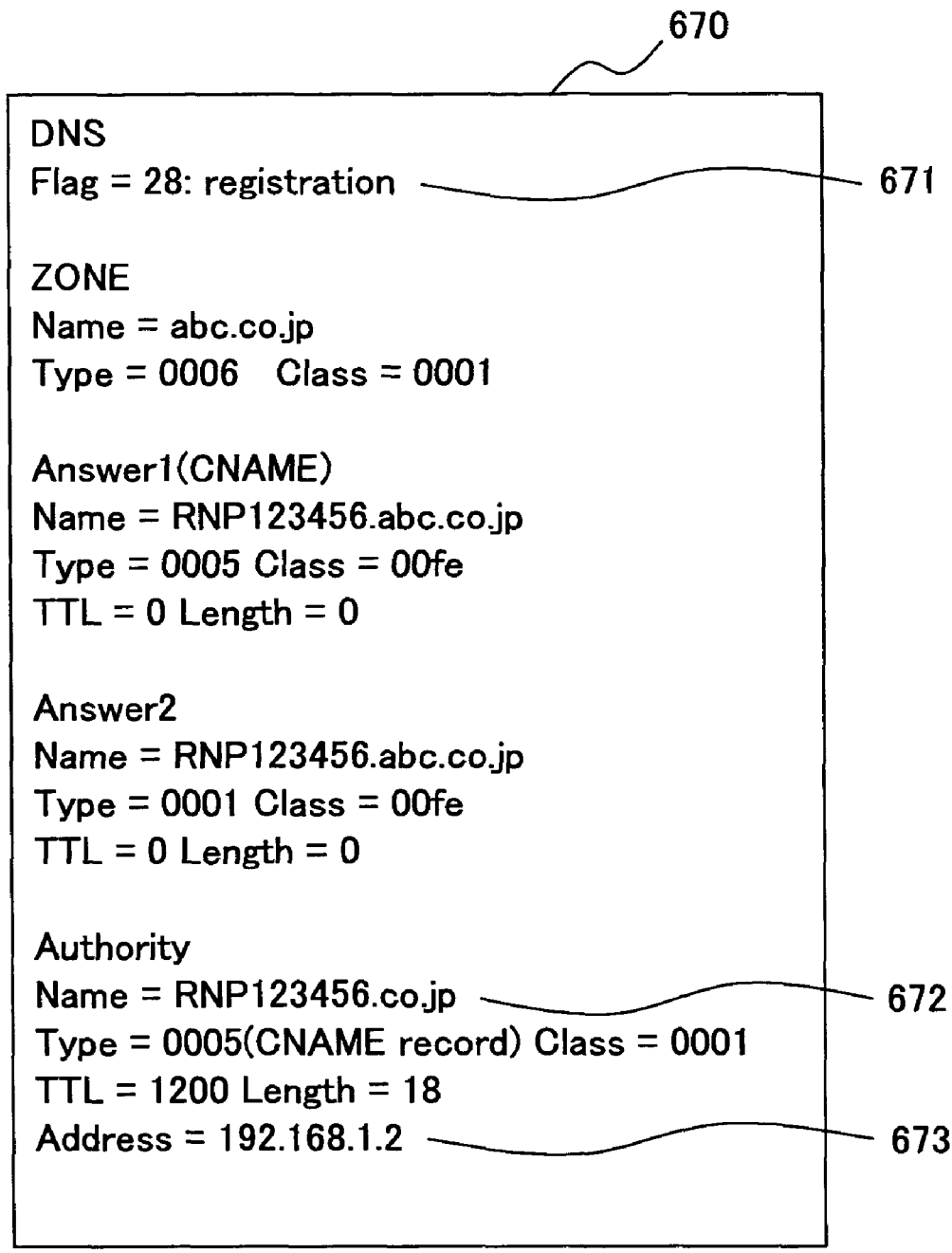
FIG. 11 is an illustrative drawing showing an example of transmitted data for requesting the registration of an alias name record.

FIG. 11 is an illustrative drawing showing an example of transmitted data for requesting the registration of an alias name record. In data 670 of FIG. 11, a description 671 indicates that the data 670 is a request for registration. Moreover, a description 671 and a description 672 indicate the alias name and the IP address to be registered, respectively.

At step S18 following step S17, the DNS server 50 registers the alias name and the IP address associated with the alias name received from the image-processing apparatus 10 into the DNS database table 51 as an alias name record. Furthermore, the DNS server 50 returns a response indicative of the proper completion of registration to the image-processing apparatus 10. With this, the procedure for registering a new host name and the like by the image-processing apparatus 10 comes to an end.

Figure 12:
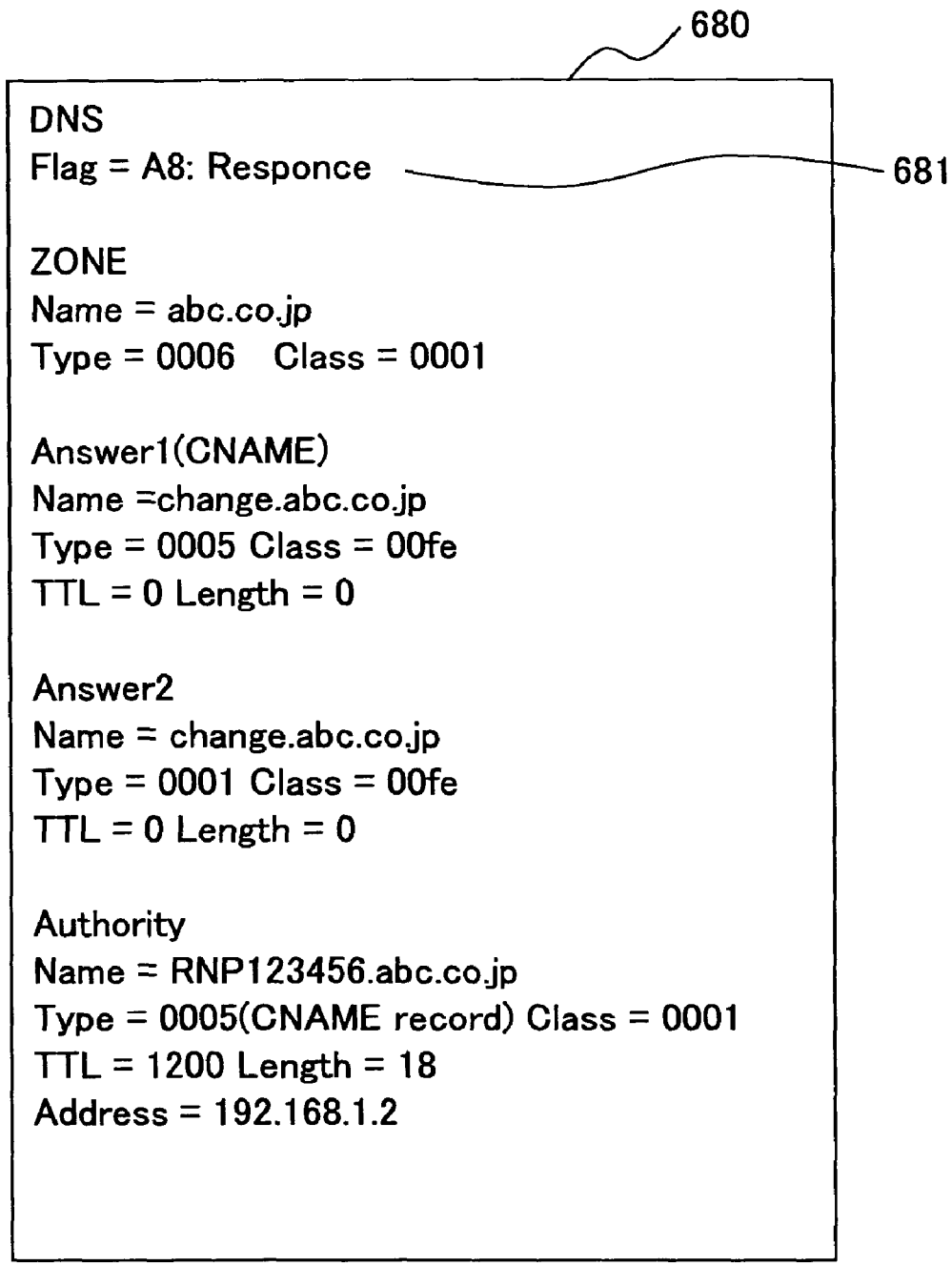
FIG. 12 is an illustrative drawing showing an example of data that serves as a response to a request for the registration of an alias name record.

FIG. 12 is an illustrative drawing showing an example of data that serves as a response to a request for the registration of an alias name record. A description 681 contained in data 680 of FIG. 12 indicates that the data 680 is a response.

Figure 13:
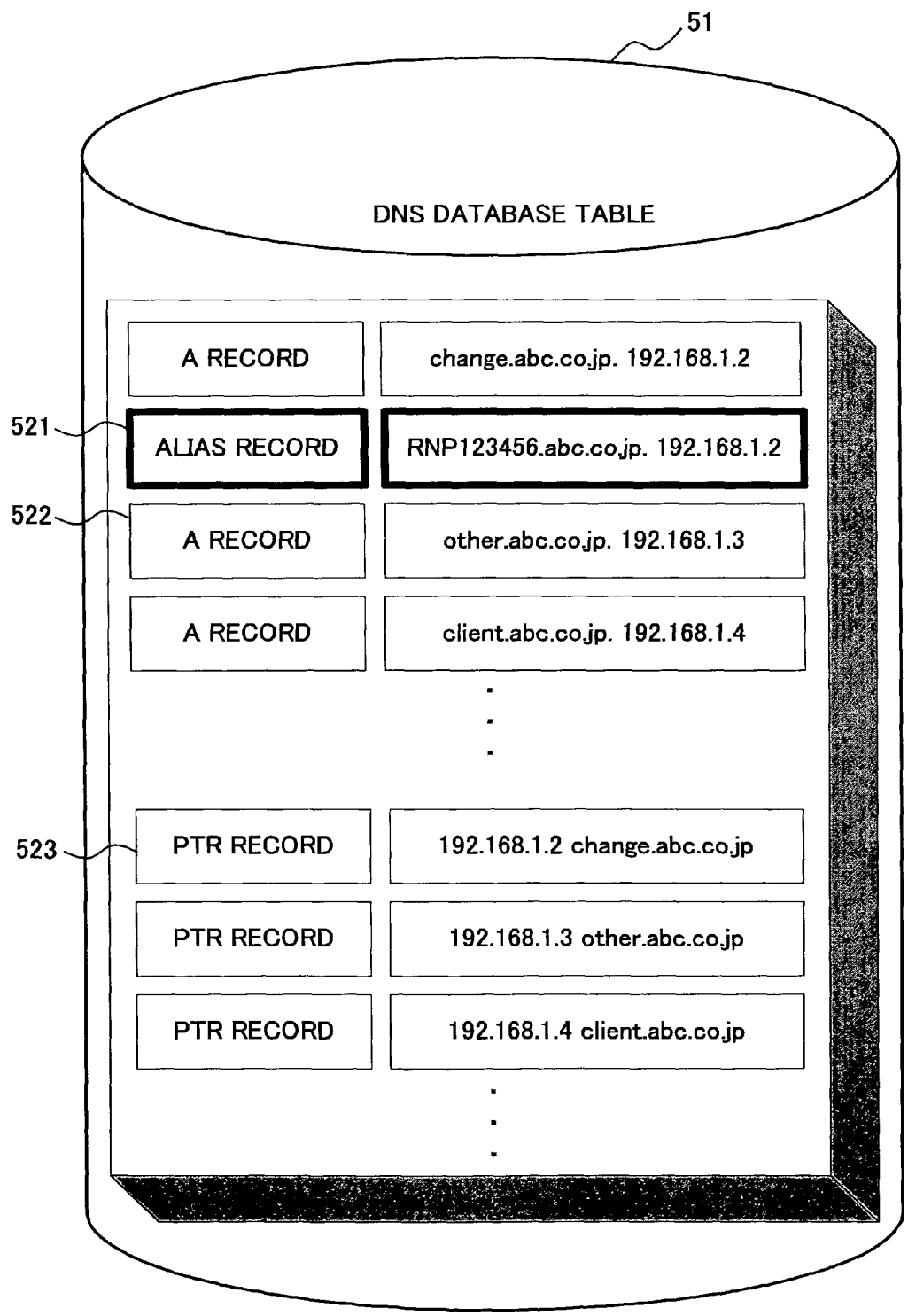
FIG. 13 is an illustrative drawing showing an example of an updated DNS database table.

FIG. 13 is an illustrative drawing showing an example of the updated DNS database table. In the DNS database table 51 of FIG. 13, a record 521 and a record 523 are the A record and the PTR record that are registered at step S13 and step S15, respectively.

Further, a record 322 is the alias name record registered at step S17.

With reference to FIG. 5 again, the user of the client PC 30 may request the printing of document data that prints to the image-processing apparatus 10. In response, the resolver of the client PC 30 requests to the DNS server 50 that a name known as that of the image-processing apparatus 10 be resolved (S19).

Figure 14:
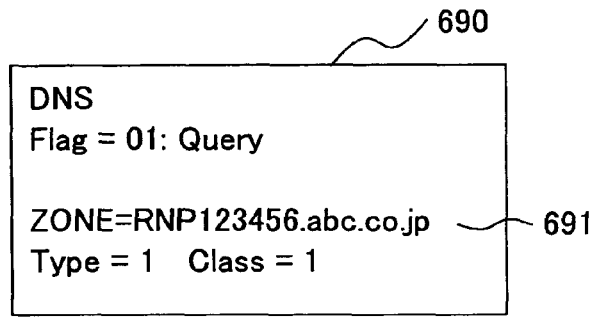
FIG. 14 is an illustrative drawing showing an example of data transmitted for the purpose of requesting the resolution of a name.

FIG. 14 is an illustrative drawing showing an example of data transmitted for the purpose of requesting the resolution of a name. A description 691 contained in data 690 of FIG. 14 indicates a name for which resolution is requested. The resolver of the client PC 30 specifies the alias name (RNP123456), rather than the host name of the DNS server 50, as a name to be resolved. This is because, in the present embodiment, each apparatus is set such as to identify other apparatuses by their alias names, and the printing port used by the client PC to print to the image-processing apparatus 10 is generated based on the alias name of the image-processing apparatus 10.

Alias names are unique to respective apparatuses, and a decision may be made in advance as to what is used as alias names (e.g., an MAC address, a serial number, or a value obtained through predetermined conversion). In such a case, each user can set up the alias name of the image-processing apparatus 10 in his/her own terminal (client PC 30 or the like) in advance.

At step S20 following step S19, the DNS server 50 refers to the record 522 of the DNS database table 51 (FIG. 13) to extract an IP address (192.168.1.2) based on the alias name (RNP123456), followed by transmitting the extracted IP address to the client PC 30.

Figure 15:
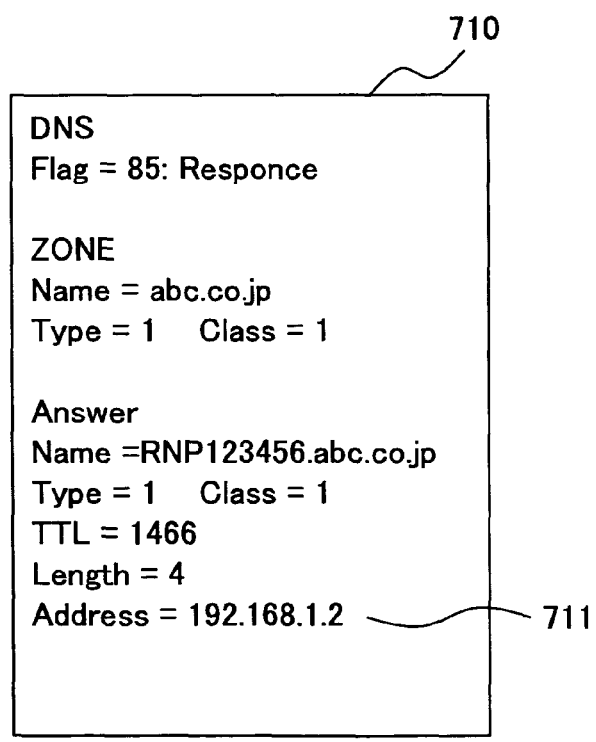
FIG. 15 is an illustrative drawing showing an example of data that serves as a response to a request for name resolution.

FIG. 15 is an illustrative drawing showing an example of data that serves as a response to a request for name resolution. A description 711 contained in data 710 of FIG. 15 gives the IP address obtained as a result of the name resolution.

Alias names are unique to each apparatus. Even if the host name of the image-processing apparatus 10 is a duplicate, therefore, the DNS server 50 can determine the record for resolving the name. Further, alias names do no change along with host names or IP addresses. This makes it possible to identify the image-processing apparatus 10 even when the host name or IP address of the image-processing apparatus 10 is changed without the knowledge of the user of the client PC 30.

With the use of alias names that are unique unlike host names, it is possible to avoid an error in resolution process caused by the presence of duplicate records or the lack of a record at the time of name resolution attempted by the DNS server 50. This ensures that a correct IP address is obtained.

In this manner, the client PC 30 successfully accesses the image-processing apparatus 10 as intended based on the IP address received from the DNS server 50, resulting in the initiation of printing (S21), the transmission of print data (S22), etc. In order to ensure the uniqueness of alias names, the image-processing apparatus 10 may refuse the setting of a host name if the host name of the image-processing apparatus 10 is newly set or changed to a name that inadvertently conforms to the naming rule of alias names. If a fixed code is contained in the MAC address, the serial number, or the like, for example, a check as to whether a name inadvertently conforms to the naming rule of alias names may be made by checking whether the fixed code makes up part of a name that is selected as a host name.

In the following, a description will be given of the operation of the image-processing apparatus 10 in relation to the procedure shown in the sequence chart of FIG. 5. That is, a description will be given with regard to how the individual units shown FIG. 4 cooperate to perform the procedure shown in FIG. 5.

Figure 16:
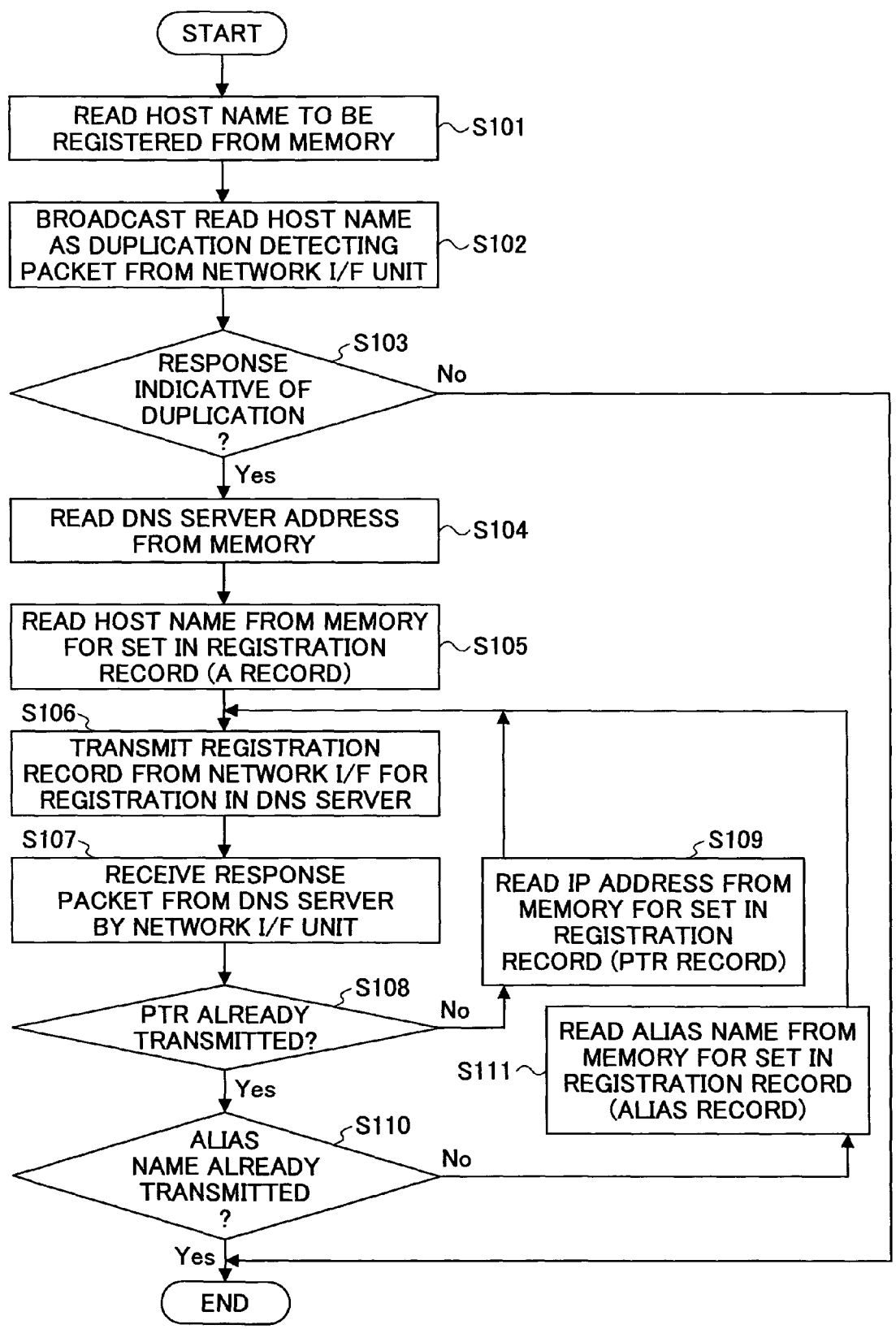
FIG. 16 is a flowchart of the operation of the image-processing apparatus performed when the host name of the image-processing apparatus is changed.

FIG. 16 is a flowchart of the operation of the image-processing apparatus performed when the host name of the image-processing apparatus is changed.

Step S101 and step S102 correspond to step S11 (FIG. 5). Namely, the control unit 13 retrieves a host name from the memory unit 14 (S101), and broadcasts data including the retrieved host name as a duplication detection packet by use of the network I/F unit 12 (S102).

When there is a response indicative of duplication (Yes at S103), the procedure comes to an end. IF there is no response indicative of duplication (No at S103), the procedure proceeds to step S104.

Step S104 through step S107 correspond to steps S13 and S14 (FIG. 5). Namely, the control unit 13 reads the IP address of the DNS server 50 and the host name of the image-processing apparatus 10 from the memory unit 14 (S104, S105), and uses the retrieved host name as a registration record for an A record. Further, the control unit 13 transmits the registration record from the network I/F unit 12 to the DNS server 50 to have the registration record registered as an A record in the DNS server 50 (S106), followed by receiving a response from the DNS server 50 through the network I/F unit 12 (S107).

Steps S108 and S109 correspond to step S15 (FIG. 5). Namely, the control unit 13 checks whether a PTR record has already been transmitted. If it has not been transmitted (No at S108), the control unit 13 reads an IP address from the memory unit 14 for use as a registration record for a PTR record (S109). Further, the control unit 13 requests the DNS server 50 to register a new registration record as a PTR record (S106), followed by receiving a response from the DNS server 50 (S107).

Steps S110 and S111 correspond to step S17 (FIG. 5). Namely, the control unit 13 checks whether an alias name record has already been transmitted. If it has not been transmitted (No at S110), the control unit 13 reads an alias name from the memory unit 14 for use as a registration record for an alias name record (S111). Further, the control unit 13 requests the DNS server 50 to register a new registration record as an alias name record (S106), followed by receiving a response from the DNS server 50 (S107).

The above description does not refer to a process that is performed when the host name of the image-processing apparatus 10 is found to be a duplicate. In the following, a description will be given of a process that is performed when the host name of the image-processing apparatus 10 is changed to a name that is already used by another apparatus.

Figure 17:
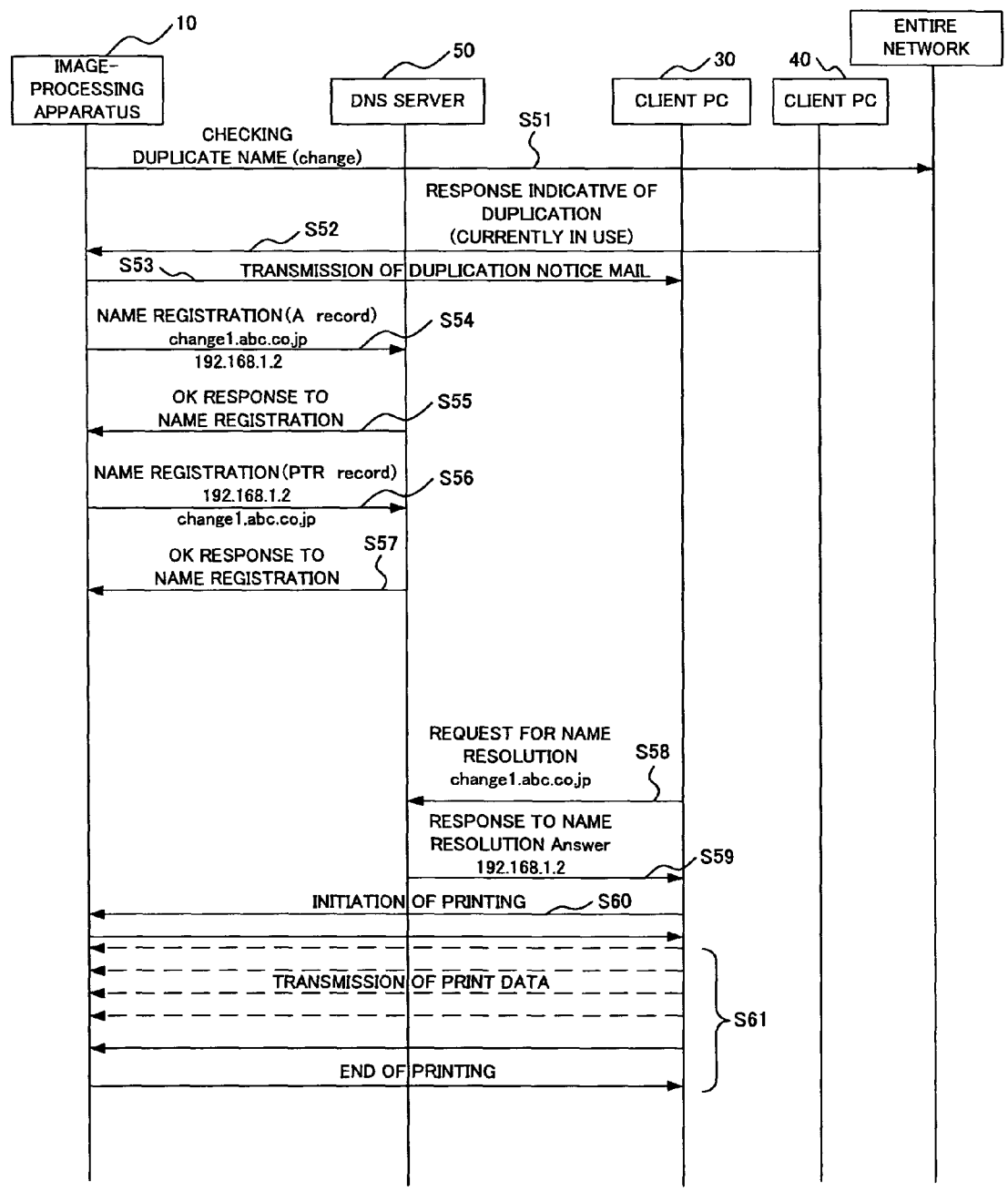
FIG. 17 is a sequence chart for explaining a procedure that is performed when a host name after change is a duplicate of the host name of another apparatus.

FIG. 17 is a sequence chart for explaining a procedure that is performed when a host name after change is a duplicate of the host name of another apparatus.

In the same manner as in step S11 of FIG. 5, when the host name of the image-processing apparatus 10 is changed to "change.abc.co.jp", the image-processing apparatus 10 broadcasts data for checking the duplication of the host name (S51). FIG. 6 is an illustrative drawing showing the data transmitted for this purpose.

It is assumed that the client PC 40 has already been using the name "change." At step S52, therefore, the client PC 40 sends a response to the image-processing apparatus 10 indicating that the name requested for a duplication check is already in use.

Figure 18:
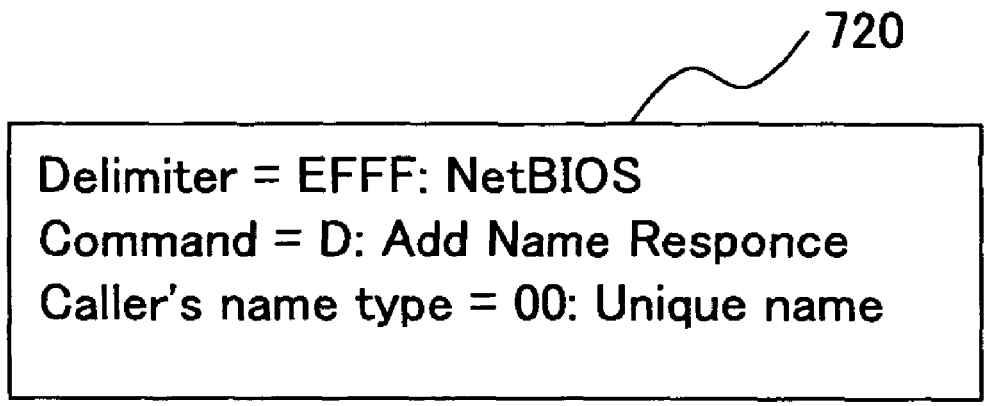
FIG. 18 is an illustrative drawing showing an example of data serving as a response indicative of name duplication.

FIG. 18 is an illustrative drawing showing an example of data serving as a response indicative of name duplication.

At step S53 following step S52, the image-processing apparatus 10 sends E-mail (hereinafter referred to as a "duplication notice mail") indicative of host name duplication to user mail addresses which are registered as notify addresses in advance. Users registered as notify addresses in advance include an administrator of the image-processing system 1, users using the image-processing apparatus 10 as a default printer, etc. In this example, the duplication notice mail is sent to the user of the client PC 30.

Figure 19:
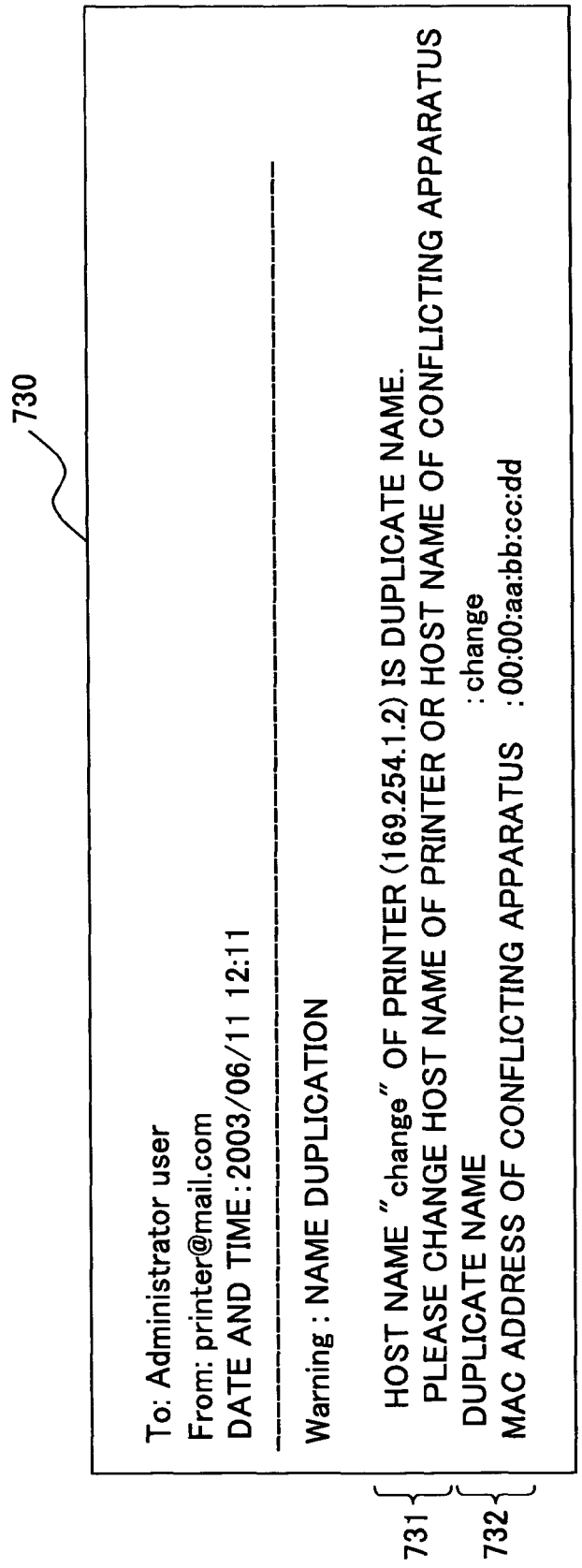
FIG. 19 is an illustrative drawing showing an example of duplication notice mail.

FIG. 19 is an illustrative drawing showing an example of the duplication notice mail. In duplication notice mail 730 of FIG. 19, a message 731 indicates that the host name of the image-processing apparatus 10 is a duplicate, and a message 732 shows the duplicate name and the MAC address of the conflicting apparatus.

With this provision, the user having received the duplication notice mail 730 learns that the host name of the image-processing apparatus 10 is a duplicate. The user also learns that there is a need to change the host name of the image-processing apparatus 10 or the host name of the conflicting apparatus to resolve the situation.

Figure 20:
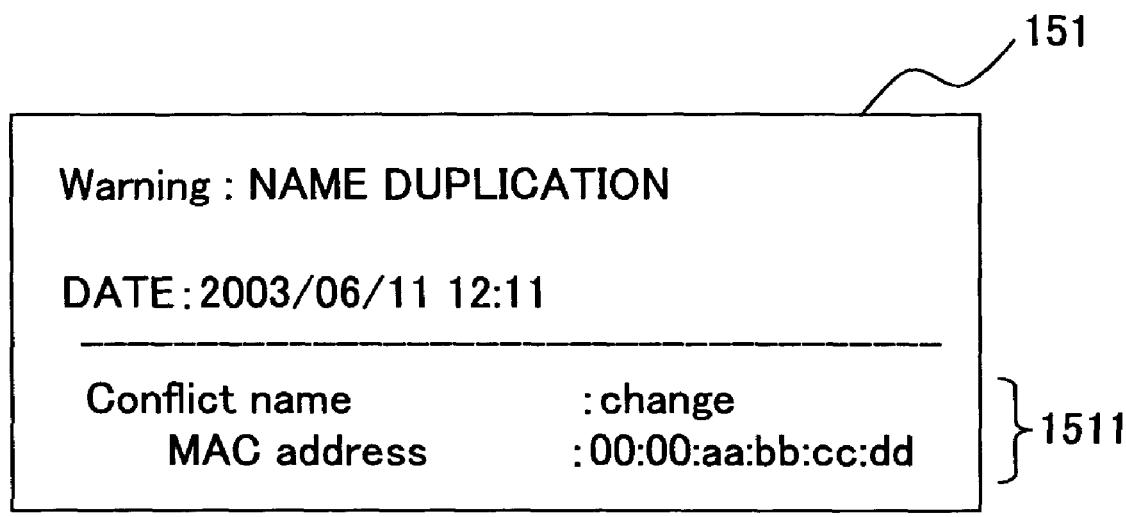
FIG. 20 is an illustrative drawing showing an example of a duplication notice on an operation panel.

Moreover, an indication of host name duplication may be displayed on the operation panel of the image-processing apparatus 10. FIG. 20 is an illustrative drawing showing an example of a duplication notice on an operation panel. On an operation panel 151 shown in FIG. 20, a message 511 is displayed to show the duplicate host name and the MAC address of the conflicting apparatus. The displaying of a duplicate notice on the operation panel makes it possible to notify a user working around the image-processing apparatus 10 that the host name is found to be a duplicate.

Figure 21:
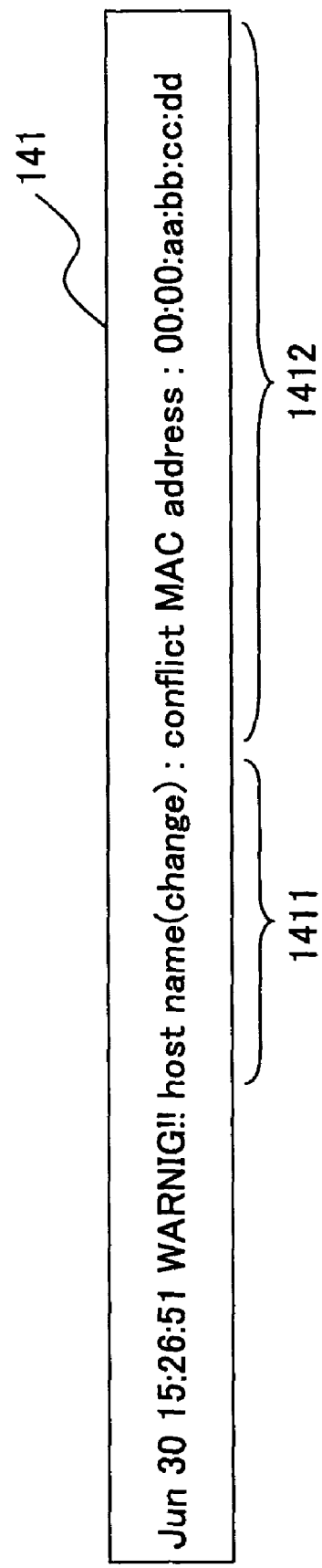
FIG. 21 is an illustrative drawing showing an example of a duplication notice serving as a system log.

Moreover, a duplication notice may be stored as a system log in the memory unit 14 of the image-processing apparatus 10. FIG. 21 is an illustrative drawing showing an example of a duplication notice serving as a system log. In a system log 141 of FIG. 21, a duplicate host name is shown in a description 1411, and the MAC address of the conflicting apparatus is shown in a description 1412. Recording in the system log provides convenience for later confirmation.

Furthermore, not only a duplication notice is reported, but also provision may be made to have the image-processing apparatus 10 perform a procedure for obviating the duplication.

For example, in step S54, the image-processing apparatus 10 attaches a suffix or the like to the duplicate host name, so that "change" may be corrected to "change1". The image-processing apparatus 10 then requests the DNS server 50 to register the corrected host name and the IP address as an A record.

At step S55 following step S54, the DNS server 50 resisters the corrected host name and the associated IP address, followed by transmitting a response indicative of the proper completion of registration to the image-processing apparatus 10.

At step S56 following step S55, the image-processing apparatus 10 requests the DNS server 50 to register the IP address and the corrected host name as a PTR record. In response, the DNS server 50 resisters the correspondence, followed by transmitting a response to the image-processing apparatus 10 (S57).

If the processes of steps S54-S57 are to be implemented, step S57 may be followed by the transmission of duplication notice mail, the display of a duplication notice on the operation panel, or the storing of a duplication notice in the system log. With such provision, the corrected host name may be included in the duplication notice mail or the like, thereby notifying a user of the corrected host name.

In this case, the user of the client PC 30 can set the host name of the image-processing apparatus 10 to the corrected host name (change1) on the client PC 30.

Accordingly, when the user of the client PC 30 subsequently requests the printing of document data that prints to the image-processing apparatus 10, the resolver of the client PC 30 requests the resolution of the corrected host name (S58), and obtains the IP address corresponding to the corrected host name (S59). In this manner, the image-processing apparatus 10 successfully accesses the image-processing apparatus 10 as intended, thereby performing the initiation of printing (S60), the transmission of print data (S61), etc.

The above description has been given with reference to an example in which the image-processing apparatus 10 is a simple printer. The image-processing apparatus 10 may alternatively be a multifunction peripheral of a multi-function type that has a functional configuration or hardware configuration as shown in FIGS. 22 and 23, for example.

Figure 22:
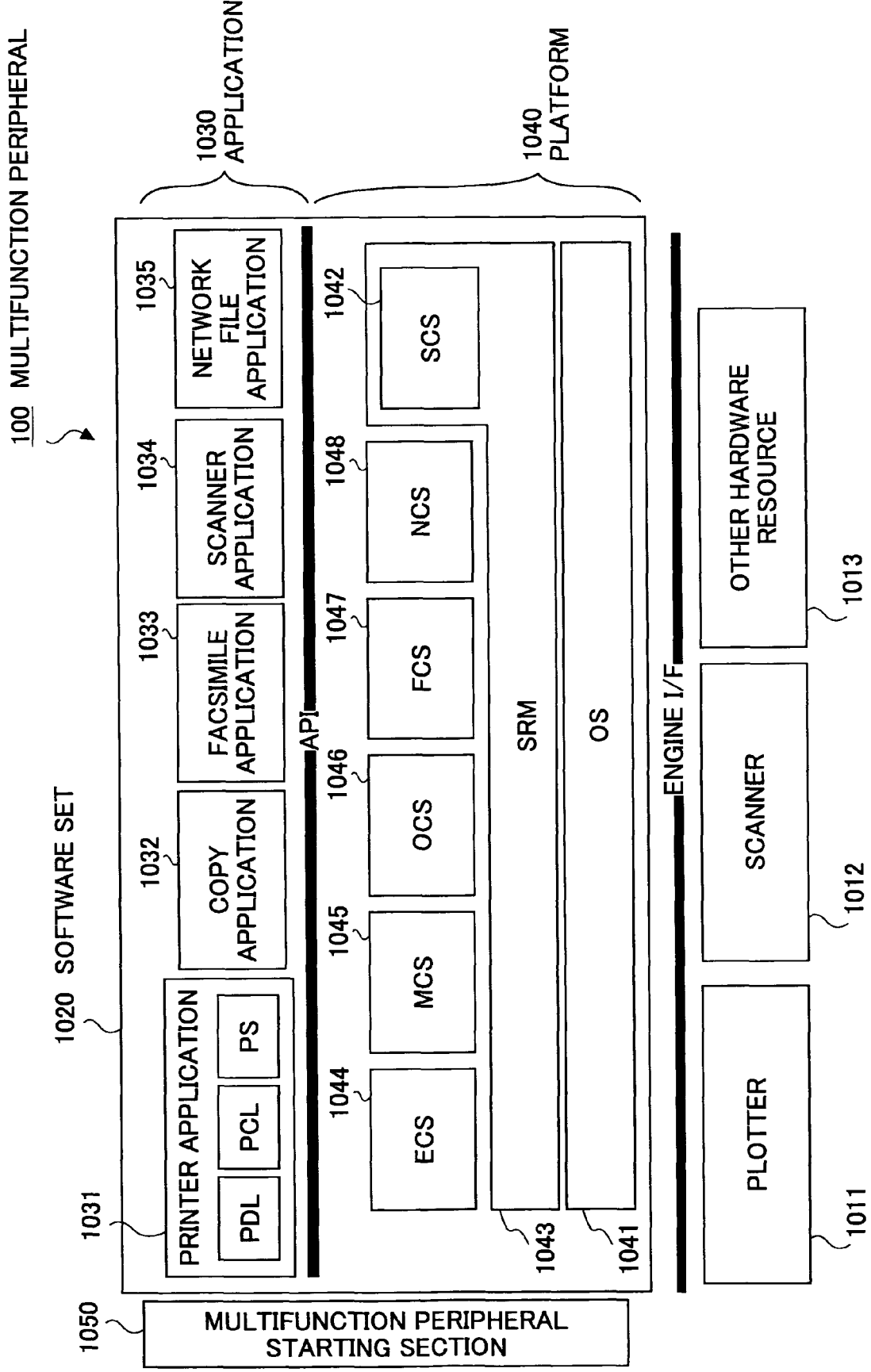
FIG. 22 is a block diagram showing an example of a multifunction peripheral.
Figure 23:
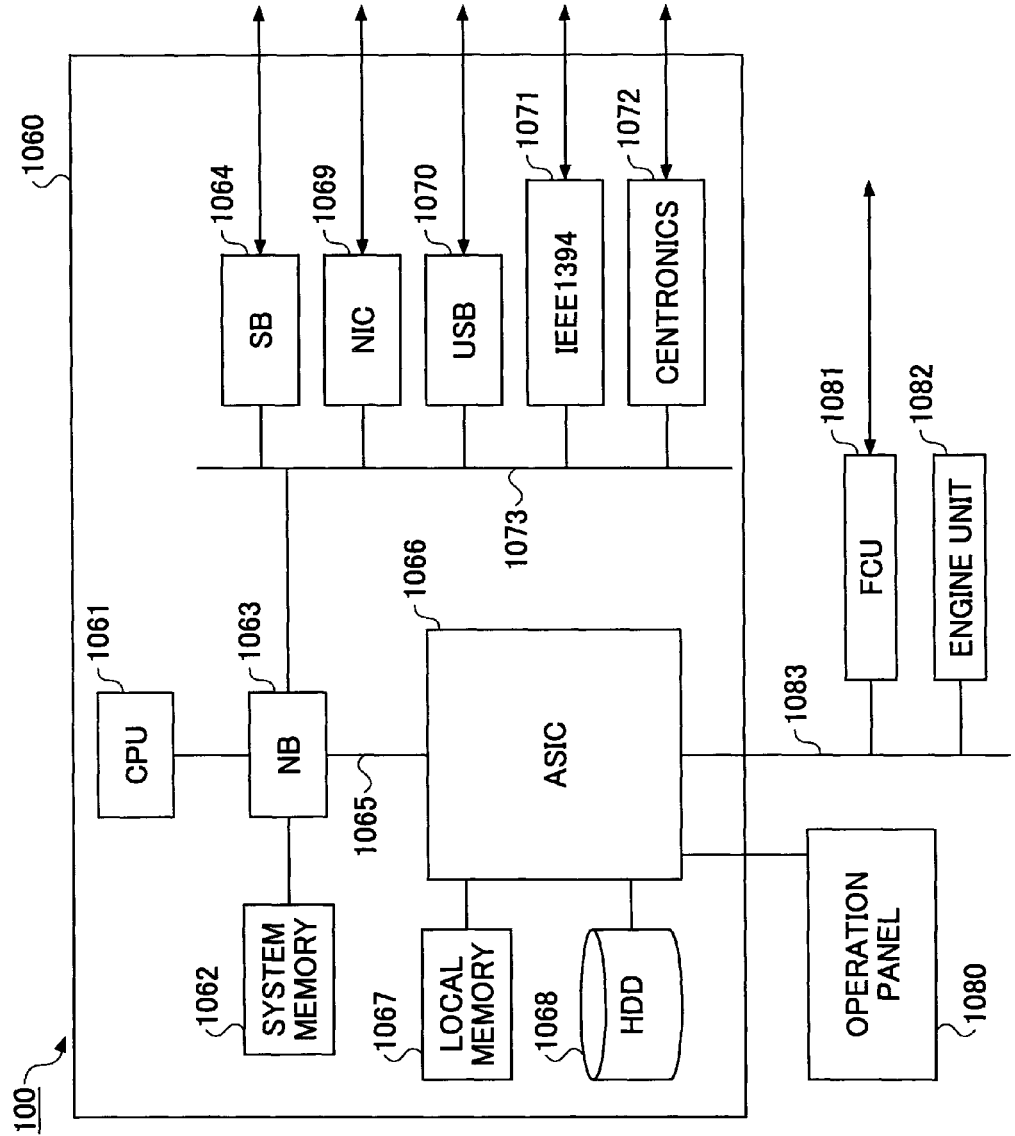
FIG. 23 is a block diagram showing a hardware construction of an example of the multifunction peripheral.

FIG. 22 is a block diagram showing an example of a multifunction peripheral. A multifunction peripheral 100 includes a plotter 1011, a scanner 1012, a hardware resource 1013 comprised of other hardware resources such as a facsimile, a software set 1020, and a multifunction-peripheral starting section 1050. The software set 1020 includes an application 1030 and a platform 1040.

The application 1030 performs user-service-specific processes relating to image formation such as a printer, a copier, a facsimile, a scanner, etc.

The application 1030 includes a printer application 1031 used for a printer based on the page description language (PDL, PCL) and Post Script (PS), a copier application 1032 used for a copier, a facsimile application 1033 used for a facsimile, a scanner application 1034 used for a scanner, and a network file application 1035 used for network files.

The platform 1040 includes a control service which interprets a processing request from the application 1030 to generate a request for acquiring hardware resources, a system resource manager (SRM) 1043 which manages one or more hardware resources to arbitrate acquisition requests from the control service, and an operating system (OS) 1041.

The control service is configured to include one or more service modules such as a system control service (SCS) 1042, an engine control service (ECS) 1044, a memory control service (MCS) 1045, an operation panel control service (OCS) 1046, a fax control service (FCS) 1047, and a network control service (NCS) 1048.

The platform 1040 is configured to include an application program interface (API), which makes it possible to receive a processing request from the application 1030 through a preset function. The OS 1041 is a UNIX (registered trademark) or the like and executes processes in parallel with respect to the software of the application 1030 and the software of the platform 1040.

The process of the SRM 1043 together with the SCS 1042 attend to system control and the management of hardware resources. For example, the process of the SRM 1043 arbitrates in response to acquisition requests from the higher-order layers that are in need of using the hardware resources such as engine, a memory, an HDD file, and a host I/O (Centronics I/F, network I/F, IEEE1394 I/F, RS232C I/F, etc.), thereby performing execution control.

Specifically, the SRM 1043 checks whether the hardware resources requested for acquisition are available (whether they are used by another request). If they are available, the SRM 1043 notifies the higher-order layer that the hardware resources requested for acquisition are available. Moreover, the SRM 1043 attends to scheduling for use of the hardware resources in response to the acquisition requests from the higher-order layers, and carries out what is requested, i.e., paper feeding and imaging by the printer engine, memory allocation, file generation, etc.

The process of the SCS 1042 attends to application management, operation-unit control, system screen display, LED display, hardware resource management, interruption application control, etc. The process of the ECS 1044 controls engines such as the plotter 1011, the scanner 1012, the other hardware resources 1013, etc.

The process of the MCS 1045 performs memory control such as the acquisition and release of image memory, the use of HDD, the compression and decompression of image data, etc. The process of the OCS 1046 controls an operation panel, which is used as a means for information exchange between an operator and a control unit.

The process of the FCS 1047 provides API for performing fax transmission and reception through the PSTN or ISDN network for each application layer of the system controller, the registration/referencing of various fax data stored in backup memory, fax scanning, received fax printing, multifunction transmission and reception, etc.

The process of the NCS 1048 provides services which are shared by applications that need network I/O. This process serves as an intermediary to distribute data to each application as the data is received through respective protocols from networks and to transmit data to the networks as the data is received from each application.

For example, the NCS 1048 controls data communication with network apparatus connected through the networks by HTTP (HyperText Transfer Protocol) by use of the httpd (HyperText Transfer Protocol Daemon).

The multifunction-peripheral starting section 1050 operates upon the power-on of the multifunction peripheral 100 first, and starts the platform 1040 and the application 1030.

The multifunction peripheral 100 uses the platform 1040 to perform all processes, in a unified manner, that are common to each application. In the following, a hardware configuration of the multifunction peripheral 100 will be described.

FIG. 23 is a block diagram showing a hardware construction of an example of the multifunction peripheral. The multifunction peripheral 100 of FIG. 23 includes a controller 1060, an operation panel 1080, a FCU 1081, and an engine 1082.

The controller 1060 includes a CPU 1061, a system memory 1062, a north bridge (NB) 1063, a south bridge (SB) 1064, an ASIC 1066, a local memory 1067, an HDD 1068, a network interface card (NIC) 1069, a USB device 1070, an IEEE1394 device 1071, and a Centronics 1072.

The operation panel 1080 is connected to the ASIC 1066 of the controller 1060. The FCU 1081 and the engine 1082 are connected to the ASIC 1066 of the controller 1060 through a PCI bus 1083.

The controller 1060 has the local memory 1067 and the HDD 1068 connected to the ASIC 1066, and the CPU 1061 and the ASIC 1066 are connected through the NB 1063 of a CPU chip set. Connecting the CPU 1061 and the ASIC 1066 together through the NB 1063, the controller 1060 makes it possible to cope with such a situation as the interface of the CPU 1061 is not released to the public. The ASIC 1066 and the NB 1063 are connected through AGP (accelerated graphics port) 1065.

In this manner, the ASIC 1066 and the NB 1063 are connected through the AGP 1065 instead of a low-speed PCI bus, thereby avoiding a drop of performance when controlling the execution of a plurality of processes which form the application 1030 and the platform 1040 of FIG. 22.

The CPU 1061 is responsible for overall control of the multifunction peripheral 100. The CPU 1061 starts and executes the SCS 1042, the SRM 1043, the ECS 1044, the MCS 1045, the OCS 1046, the FCS 1047, and the NCS 1048 on the OS 1041, and also starts and executes the printer application 1031, the copy application 1032, the fax application 1033, the scanner application 1034, and the network file application 1035, which make up the application 1030.

The NB 1063 is a bridge for connecting the CPU 1061, the system memory 1062, the SB 1064, the ASIC 1066, the NIC 1069, the USB device 1070, the IEEE1394 device 1071, and the Centronics 1072.

The SB 1064, the NIC 1069, the USB device 1070, the IEEE1394 device 1071, and the Centronics 1072 are coupled to the NB 1063 through the PCI bus 1073. The SB 1064 is a bridge for connecting the PCI bus 1073 with the ROM and other peripheral devices.

The system memory 1062 is used as a picture-rendering memory and the like of the multifunction peripheral 100. The local memory 1067 is used as a copy-purpose image buffer and also as a code buffer.

The ASIC 1066 is an image-processing-purpose IC that includes hardware elements for image processing. The HDD 1068 is a storage (secondary storage device) for storing image data, document data, programs, font data, forms, etc.

The NIC 1069 is an interface device for connecting the multifunction peripheral 100 to a network. The USB device 1070, the IEEE1394 device 1071, and the Centronics 1072 are interfaces complying to the respective standards.

The operation panel 1080 serves as an operating unit to receive inputs from an operator and to provide display presentation to the operator. The FCU 1081 has a backup-purpose memory. The memory of the FCU 1081 is used for the temporal storage of facsimile data, for example, when the facsimile data is received during the power-off of the multifunction peripheral 100.

The correspondences between FIG. 23 and FIG. 4 are as follows. The CPU 1061 corresponds to the control unit 13, the system memory 1062, the local memory 1067, and the HDD 1068 to the memory unit 14, the NIC 1069, the USB 1070, the IEEE1394 device 1071, and the Centronics 1072 to the network I/F unit 12, the engine unit 1082 to the engine unit 11, and the operation panel 1080 to the operation unit 15.

Further, the present invention is not limited to these embodiments, but various variations and modifications may be made without departing from the scope of the present invention.

The present application is based on Japanese priority application No. 2003-323540 filed on Sep. 16, 2003, with the Japanese Patent Office, the entire contents of which are hereby incorporated by reference.

What is claimed is:

1. An image processing apparatus having an interface for communication with a network including a DNS server, comprising:
   a non-transitory computer-readable storage medium storing modules comprising:

a name duplication detecting unit configured to broadcast data on the network for checking for a duplicate host name in response to a selection of a host name of the image processing apparatus, wherein
if a response is received from another device on the network indicating that a duplicate of the selected host name exists, another host name is selected to obviate the duplication;
a name registration requesting unit configured to, once a non-duplicate host name is selected, transmit a registration request to the DNS server requesting registration of a correspondence regarding the host name in relation to address information of the image processing apparatus;
an alias registration requesting unit configured to transmit a registration request to the DNS server requesting registration of a correspondence regarding a unique alias corresponding to a hardware component of the image processing apparatus in relation to the address information, the alias being different from said host name and based on a value corresponding to the image processing apparatus that is not dynamically modified; and
an address registration requesting unit configured to transmit a registration request to the DNS server requesting registration of a correspondence regarding the address information in relation to only the host name selected from the host name and the alias.

2. The image processing apparatus as claimed in claim 1, wherein said alias is an MAC address of the image processing apparatus.

3. The image processing apparatus as claimed in claim 1, wherein said alias is a serial number of the image processing apparatus.

4. The image processing apparatus as claimed in claim 1, wherein said alias is generated based on one of an MAC address and a serial number of the image processing apparatus.

5. The image processing apparatus as claimed in claim 1, wherein setting of the host name is refused in response to an attempt to set the host name to a name conforming to a naming rule of said alias.

6. The image processing apparatus as claimed in claim 1, wherein a name duplication notifying unit notifies of the name duplication by email.

7. The image processing apparatus as claimed in claim 1, wherein a name duplication notifying unit displays an indication of the name duplication on an operation panel of said image processing apparatus.

8. The image processing apparatus as claimed in claim 1, wherein a name duplication notifying unit stores an indication of the name duplication in memory.

9. The image processing apparatus as claimed in claim 1, wherein said name registration requesting unit uses a name converted from the host name through predetermined conversion as a name to be registered in the DNS server in response to the name duplication detected by said name duplication detecting unit.

10. The image processing apparatus as claimed in claim 9, wherein a name duplication notifying unit notifies of the name converted from the host name through the predetermined conversion.

11. An image processing system, comprising:
a DNS server;
an image processing apparatus coupled to said DNS server through a network; and
an information processing apparatus configured to request said image processing apparatus to print image data, wherein said image processing apparatus includes:

a name duplication detecting unit configured to broadcast data on the network for checking for a duplicate host name in response to a selection of a host name of the image processing apparatus, wherein
if a response is received from another device on the network indicating that a duplicate of the selected host name exists, another host name is selected to obviate the duplication;
a name registration requesting unit configured to, once a non-duplicate host name is selected, transmit a registration request to the DNS server requesting registration of a correspondence regarding the host name in relation to address information of the image processing apparatus;
an alias registration requesting unit configured to transmit a registration request to the DNS server requesting registration of a correspondence regarding a unique alias corresponding to a hardware component of the image processing apparatus in relation to the address information, the alias being different from said host name and based on a value corresponding to the image processing apparatus that is not dynamically modified; and
an address registration requesting unit configured to transmit a registration request to the DNS server requesting registration of a correspondence regarding the address information in relation to only the host name selected from the host name and the alias.

12. The image processing system of claim 11, wherein the DNS server does not store a correspondence regarding the address information of in relation to the alias such that the alias can not be looked up based on the address information.

13. A method of registering a name for an image processing apparatus having an interface for communication with a network including a DNS server, comprising:
broadcasting data on the network for checking for a duplicate host name in response to a selection of a host name of the image processing apparatus, wherein
if a response is received from another device on the network indicating that a duplicate of the selected host name exists, another host name is selected to obviate the duplication;
transmitting, once a non-duplicate host name is selected, a registration request to the DNS server requesting registration of a correspondence regarding the host name in relation to address information of the image processing apparatus;
transmitting a registration request to the DNS server requesting registration of a correspondence regarding a unique alias corresponding to a hardware component of the image processing apparatus in relation to the address information, the alias being different from said host name and based on a value corresponding to the image processing apparatus that is not dynamically modified; and
transmitting a registration request to the DNS server requesting registration of a correspondence regarding the address information in relation to only the host name selected from the host name and the alias.

14. A non-transitory computer-readable record medium having a program embodied therein for causing an image processing apparatus having an interface for communication with a network including a DNS server to perform:
broadcasting data on the network for checking for a duplicate host name in response to a selection of a host name of the image processing apparatus, wherein if a response is received from another device on the network indicating that a duplicate of the selected host name exists, another host name is selected to obviate the duplication;

transmitting, once a non-duplicate host name is selected, a registration request to the DNS server requesting registration of a correspondence regarding the host name in relation to and address information of the image processing apparatus;

transmitting a registration request to the DNS server requesting registration of a correspondence regarding a unique alias corresponding to a hardware component of the image processing apparatus in relation to the address information, the alias being different from said host name and based on a value corresponding to the image processing apparatus that is not dynamically modified; and an address registration requesting unit configured to transmit a registration request to the DNS server requesting registration of a correspondence regarding the address information in relation to only the host name selected from the host name and the alias.

* * * * *